US008315364B2

(12) United States Patent
Katz

(10) Patent No.: US 8,315,364 B2
(45) Date of Patent: *Nov. 20, 2012

(54) COMMERCIAL PRODUCT TELEPHONIC ROUTING SYSTEM WITH MOBILE WIRELESS AND VIDEO VENDING CAPABILITY

(75) Inventor: Ronald A. Katz, Los Angeles, CA (US)

(73) Assignee: Telebuyer, LLC, Los Angeles, CA (US)

( * ) Notice: Subject to any disclaimer, the term of this patent is extended or adjusted under 35 U.S.C. 154(b) by 1478 days.

This patent is subject to a terminal disclaimer.

(21) Appl. No.: 10/686,883

(22) Filed: Oct. 16, 2003

(65) Prior Publication Data

US 2004/0076275 A1 Apr. 22, 2004

Related U.S. Application Data

(63) Continuation of application No. 10/323,222, filed on Dec. 18, 2002, now abandoned, which is a continuation-in-part of application No. 09/371,212, filed on Aug. 10, 1999, now Pat. No. 7,848,496, which is a continuation of application No. 08/189,405, filed on Jan. 27, 1994, now Pat. No. 6,323,894, which is a continuation-in-part of application No. 08/154,313, filed on Nov. 17, 1993, now Pat. No. 5,495,284, which is a continuation-in-part of application No. 08/067,783, filed on May 25, 1993, now abandoned, which is a continuation-in-part of application No. 08/031,235, filed on Mar. 12, 1993, now Pat. No. 5,412,708.

(51) Int. Cl.
*H04M 11/00* (2006.01)
(52) U.S. Cl. .................................. 379/93.12; 348/14.01
(58) Field of Classification Search ............... 379/93.12, 379/91.01, 93.25, 90.01, 93.17, 93.21, 93.02, 379/93.24; 705/26–27, 37, 27.2; 348/14.01, 348/14.08, 14.05
See application file for complete search history.

(56) References Cited

U.S. PATENT DOCUMENTS

| 1,162,336 | A | 11/1915 | Campbell |
| 2,575,606 | A | 11/1951 | Wales et al. |
| 2,957,567 | A | 10/1960 | Doud |
| 3,144,518 | A | 8/1964 | Lummis |

(Continued)

FOREIGN PATENT DOCUMENTS

CA 1162336 2/1984

(Continued)

OTHER PUBLICATIONS

Ackerman, Lorrie F., et al., "The Video Phone: New Life for an Old Idea?" Apr. 1992, pp. 1-47 (paper).

(Continued)

*Primary Examiner* — Stella Woo

(57) ABSTRACT

A traffic control system selectively interfaces members of plural groups, exemplified as buyer groups and vendor groups, for video communication through a dial-up telephone system, for analyzing and compiling data to selectively implement communication, as for consummating sales and the like. The traffic-control system comprises a telephonic interface apparatus for interfacing remote telephonic terminals of the dial-up telephone system identified with the members of plural groups, a video recording unit for recording and playing video transcriptions, a storage memory for storing data on the members, including telephonic terminal numbers and area-of-interest codes and a control computer to process data and selectively interconnect the video source with the remote telephone terminals through the telephonic interface apparatus to receive video communication.

108 Claims, 9 Drawing Sheets

U.S. PATENT DOCUMENTS

| | | | |
|---|---|---|---|
| 3,504,130 A | 3/1966 | Gorgas et al. | |
| 3,246,082 A | 4/1966 | Levy | |
| 3,253,689 A | 5/1966 | Thompson | |
| 3,445,633 A | 5/1969 | Ratner | |
| 3,515,807 A | 6/1970 | Clark | |
| 3,544,727 A | 12/1970 | Sloan et al. | |
| 3,609,250 A | 9/1971 | Morris | |
| 3,622,995 A | 11/1971 | Dilks et al. | |
| 3,691,308 A | 9/1972 | Angner et al. | |
| 3,705,384 A | 12/1972 | Wahlberg | |
| 3,725,587 A | 4/1973 | Klein | 179/2 |
| 3,775,563 A | 11/1973 | Klein | 179/2 |
| 3,792,202 A | 2/1974 | Adams, Jr. et al. | |
| 3,792,446 A | 2/1974 | McFiggins et al. | |
| 3,794,774 A | 2/1974 | Kemmerly et al. | |
| 3,881,060 A | 4/1975 | Connell et al. | |
| 3,903,373 A | 9/1975 | Guekdenpfnnig et al. | |
| 3,909,553 A | 9/1975 | Marshall | |
| 3,912,874 A | 10/1975 | Botterell et al. | |
| 3,991,282 A | 11/1976 | Feil | |
| 4,004,084 A | 1/1977 | Brown et al. | 358/133 |
| 4,027,098 A | 5/1977 | Reisch et al. | |
| 4,037,250 A | 7/1977 | McGahan et al. | |
| 4,054,908 A | 10/1977 | Poirier et al. | 358/85 |
| 4,070,698 A | 1/1978 | Curtis et al. | |
| 4,090,038 A | 5/1978 | Biggs | |
| 4,137,429 A | 1/1979 | Stockdale | |
| 4,139,731 A | 2/1979 | Hashemi et al. | |
| 4,141,006 A | 2/1979 | Braxton | |
| 4,150,254 A | 4/1979 | Schussler et al. | |
| 4,150,259 A | 4/1979 | Fenton et al. | |
| 4,173,024 A | 10/1979 | Miller | |
| 4,186,438 A | 1/1980 | Benson et al. | |
| 4,190,819 A | 2/1980 | Burgyan | |
| 4,193,114 A | 3/1980 | Benini | |
| 4,194,242 A | 3/1980 | Robbins | |
| 4,195,864 A | 4/1980 | Morton et al. | |
| 4,232,198 A | 11/1980 | Warman | |
| 4,247,759 A | 1/1981 | Yuris et al. | |
| 4,259,549 A | 3/1981 | Stehman | |
| 4,262,333 A | 4/1981 | Horigome et al. | |
| 4,270,042 A | 5/1981 | Case | |
| 4,277,649 A | 7/1981 | Sheinbein | |
| 4,289,930 A | 9/1981 | Connolly et al. | |
| 4,295,008 A | 10/1981 | Johnson et al. | |
| 4,332,980 A | 6/1982 | Reynolds et al. | 179/2 |
| 4,346,442 A | 8/1982 | Musmanno | |
| 4,359,631 A | 11/1982 | Lockwood et al. | |
| 4,360,345 A | 11/1982 | Hon | |
| 4,360,827 A | 11/1982 | Braun | |
| RE31,144 E | 2/1983 | Feil | |
| 4,376,875 A | 3/1983 | Beirne | |
| 4,393,277 A | 7/1983 | Besen et al. | |
| 4,400,724 A | 8/1983 | Fields | 358/85 |
| 4,412,287 A | 10/1983 | Braddock, III | |
| 4,424,418 A | 1/1984 | Moore et al. | |
| 4,424,572 A | 1/1984 | Lorig et al. | |
| 4,449,186 A | 5/1984 | Kelly et al. | |
| 4,450,477 A | 5/1984 | Lovett | |
| 4,451,701 A | 5/1984 | Bendig | |
| 4,455,455 A | 6/1984 | Little | |
| 4,456,789 A | 6/1984 | Groves et al. | |
| 4,460,807 A | 7/1984 | Kerr et al. | 179/18 |
| 4,475,189 A | 10/1984 | Herr et al. | 370/62 |
| 4,475,190 A | 10/1984 | Marouf et al. | |
| 4,479,185 A | 10/1984 | Cook | |
| 4,479,195 A | 10/1984 | Herr et al. | 364/900 |
| 4,490,810 A | 12/1984 | Hon | |
| 4,493,948 A | 1/1985 | Sues et al. | |
| 4,496,943 A | 1/1985 | Greenblatt | |
| 4,528,643 A | 7/1985 | Freeny, Jr. | |
| 4,529,839 A | 7/1985 | Colton et al. | 179/2 |
| 4,529,840 A | 7/1985 | Colton et al. | 179/2 |
| 4,531,024 A | 7/1985 | Colton et al. | 179/2 |
| 4,540,850 A | 9/1985 | Herr et al. | |
| 4,541,087 A | 9/1985 | Comstock | |
| 4,544,804 A | 10/1985 | Herr et al. | |
| 4,550,224 A | 10/1985 | Winchell | |
| 4,553,222 A | 11/1985 | Kurland et al. | |
| 4,559,415 A | 12/1985 | Bernard et al. | |
| 4,566,030 A | 1/1986 | Nickerson et al. | |
| 4,567,359 A | 1/1986 | Lockwood | |
| 4,574,374 A | 3/1986 | Scordo | 370/62 |
| 4,577,065 A | 3/1986 | Frey et al. | |
| 4,577,067 A | 3/1986 | Levy et al. | |
| RE32,115 E | 4/1986 | Lockwood et al. | |
| 4,580,012 A | 4/1986 | Matthews et al. | |
| 4,591,906 A | 5/1986 | Morales-Garza et al. | |
| 4,611,095 A | 9/1986 | LeBlanc et al. | |
| 4,625,081 A | 11/1986 | Lotito et al. | |
| 4,626,836 A | 12/1986 | Curtis et al. | |
| 4,635,251 A | 1/1987 | Stanley et al. | |
| 4,641,127 A | 2/1987 | Hogan et al. | |
| 4,645,872 A | 2/1987 | Pressman et al. | 379/54 |
| 4,645,873 A | 2/1987 | Chomet | |
| 4,648,108 A | 3/1987 | Ellis et al. | |
| 4,649,563 A | 3/1987 | Riskin | |
| 4,652,998 A | 3/1987 | Koza et al. | |
| 4,653,045 A | 3/1987 | Stanley et al. | |
| 4,654,482 A | 3/1987 | DeAngelis | |
| 4,656,654 A | 4/1987 | Dumas | |
| 4,674,044 A | 6/1987 | Kalmus et al. | |
| 4,691,347 A | 9/1987 | Stanley et al. | |
| 4,694,490 A | 9/1987 | Harvey et al. | |
| 4,704,725 A | 11/1987 | Harvey et al. | |
| 4,706,121 A | 11/1987 | Young | |
| 4,710,917 A | 12/1987 | Tompkins et al. | 370/62 |
| 4,712,191 A | 12/1987 | Penna | |
| 4,715,059 A | 12/1987 | Cooper-Hart et al. | 379/53 |
| 4,720,849 A | 1/1988 | Tayama | |
| 4,727,243 A | 2/1988 | Savar | |
| 4,734,858 A | 3/1988 | Schlafly | |
| 4,736,407 A | 4/1988 | Dumas | |
| 4,739,478 A | 4/1988 | Roberts et al. | |
| 4,739,510 A | 4/1988 | Jeffers et al. | |
| 4,742,457 A | 5/1988 | Leon et al. | |
| 4,744,103 A | 5/1988 | Dahlquist et al. | |
| 4,745,468 A | 5/1988 | Von Kohorn | |
| 4,751,640 A | 6/1988 | Lucas et al. | |
| 4,755,871 A | 7/1988 | Morales-Garza et al. | |
| 4,757,267 A | 7/1988 | Riskin | |
| 4,758,872 A | 7/1988 | Hada | |
| 4,761,684 A | 8/1988 | Clark et al. | |
| 4,763,191 A | 8/1988 | Gordon et al. | |
| 4,766,592 A | 8/1988 | Baral et al. | |
| 4,775,935 A | 10/1988 | Yourick | |
| 4,788,682 A | 11/1988 | Vij et al. | |
| 4,789,863 A | 12/1988 | Bush | |
| 4,789,928 A | 12/1988 | Fujisaki | |
| 4,791,666 A | 12/1988 | Cobb et al. | |
| 4,792,968 A | 12/1988 | Katz | |
| 4,794,530 A | 12/1988 | Yukiura et al. | |
| 4,796,293 A | 1/1989 | Blinken et al. | |
| 4,797,911 A | 1/1989 | Szlam et al. | |
| 4,797,913 A | 1/1989 | Kaplan et al. | |
| 4,799,156 A | 1/1989 | Shavit et al. | |
| 4,803,348 A | 2/1989 | Lohrey et al. | |
| 4,805,134 A | 2/1989 | Calo et al. | |
| 4,807,023 A | 2/1989 | Bestler et al. | |
| 4,812,628 A | 3/1989 | Boston | |
| 4,823,265 A | 4/1989 | Nelson | |
| 4,825,045 A | 4/1989 | Humble | |
| 4,825,457 A | 4/1989 | Lebowitz | |
| 4,827,500 A | 5/1989 | Binkerd et al. | |
| 4,833,308 A | 5/1989 | Humble | |
| 4,833,710 A | 5/1989 | Hirashima | |
| 4,843,377 A | 6/1989 | Fuller et al. | |
| 4,845,636 A | 7/1989 | Walker | |
| 4,845,658 A | 7/1989 | Gifford | |
| 4,845,739 A | 7/1989 | Katz | |
| 4,847,677 A | 7/1989 | Music et al. | 358/13 |
| 4,847,829 A | 7/1989 | Tompkins et al. | 370/62 |
| 4,852,154 A | 7/1989 | Lewis et al. | |
| 4,870,579 A | 9/1989 | Hey | |
| 4,873,662 A | 10/1989 | Sargent | |
| 4,876,597 A | 10/1989 | Roy et al. | |
| 4,876,648 A | 10/1989 | Lloyd | |

| | | | | | |
|---|---|---|---|---|---|
| 4,878,240 A | 10/1989 | Lin et al. | 5,204,670 A | 4/1993 | Stinton |
| 4,878,242 A | 10/1989 | Springer et al. | 5,206,803 A | 4/1993 | Vitagliano et al. |
| 4,885,685 A | 12/1989 | Wolfberg et al. | 5,209,665 A | 5/1993 | Billings et al. |
| 4,887,208 A | 12/1989 | Schneider et al. | 5,220,501 A | 6/1993 | Lawlor et al. |
| 4,893,248 A | 1/1990 | Pitts et al. | 5,222,018 A | 6/1993 | Sharpe et al. |
| 4,893,325 A | 1/1990 | Pankonen et al. | 5,224,157 A | 6/1993 | Yamada et al. |
| 4,893,326 A | 1/1990 | Duran et al. | 5,229,850 A | 7/1993 | Toyoshima |
| 4,897,867 A | 1/1990 | Foster et al. ............... 379/94 | 5,231,571 A | 7/1993 | D'Agostino |
| 4,903,201 A | 2/1990 | Wagner | 5,233,654 A | 8/1993 | Harvey et al. |
| 4,907,160 A | 3/1990 | Duncan et al. | 5,235,509 A | 8/1993 | Mueller et al. |
| 4,908,761 A | 3/1990 | Tai | 5,235,680 A | 8/1993 | Bijinagte |
| 4,910,672 A | 3/1990 | Off et al. | 5,237,499 A | 8/1993 | Garback |
| 4,910,676 A | 3/1990 | Alldredge | 5,237,500 A | 8/1993 | Perg et al. |
| 4,916,435 A | 4/1990 | Fuller | 5,237,620 A | 8/1993 | Deaton et al. |
| 4,922,520 A | 5/1990 | Bernard et al. | 5,239,462 A | 8/1993 | Jones et al. |
| 4,926,325 A | 5/1990 | Benton et al. | 5,241,464 A | 8/1993 | Greulich et al. |
| 4,928,177 A | 5/1990 | Martinez | 5,241,587 A | 8/1993 | Horton et al. |
| 4,937,856 A | 6/1990 | Natarajan | 5,241,671 A | 8/1993 | Reed et al. |
| 4,939,773 A | 7/1990 | Katz | 5,247,347 A | 9/1993 | Litteral et al. ............... 358/85 |
| 4,943,995 A | 7/1990 | Daudelin et al. | 5,262,942 A | 11/1993 | Earle |
| 4,945,410 A | 7/1990 | Walling ............... 358/141 | 5,264,929 A | 11/1993 | Yamaguchi |
| 4,947,028 A | 8/1990 | Gorog | 5,270,920 A | 12/1993 | Pearse et al. |
| 4,951,196 A | 8/1990 | Jackson | 5,283,637 A | 2/1994 | Goolcharan ............... 348/17 |
| 4,952,928 A | 8/1990 | Carroll et al. | 5,283,638 A | 2/1994 | Engberg et al. ............... 348/14 |
| 4,954,886 A | 9/1990 | Elberbaum | 5,283,639 A | 2/1994 | Esch et al. ............... 348/6 |
| 4,955,052 A | 9/1990 | Hussain | 5,283,731 A | 2/1994 | Lalonde et al. |
| 4,962,473 A | 10/1990 | Crain | 5,283,819 A | 2/1994 | Glick et al. ............... 379/90 |
| 4,965,819 A | 10/1990 | Kannes ............... 379/53 | 5,285,383 A | 2/1994 | Lindsey et al. |
| 4,965,825 A | 10/1990 | Harvey et al. | 5,289,275 A | 2/1994 | Ishii et al. |
| 4,967,366 A | 10/1990 | Kaehler | 5,293,615 A | 3/1994 | Amado |
| 4,972,318 A | 11/1990 | Brown et al. | 5,295,064 A | 3/1994 | Malec et al. |
| 4,980,826 A | 12/1990 | Wagner | 5,297,197 A | 3/1994 | Katz |
| 4,987,590 A | 1/1991 | Katz | 5,305,196 A | 4/1994 | Deaton et al. |
| 4,989,233 A | 1/1991 | Schakowsky et al. | 5,305,200 A | 4/1994 | Hartheimer et al. |
| 4,992,866 A | 2/1991 | Morgan | 5,309,355 A | 5/1994 | Lockwood |
| 4,992,940 A | 2/1991 | Dworkin | 5,319,542 A | 6/1994 | King, Jr. et al. |
| 4,996,642 A | 2/1991 | Hey | 5,321,514 A | 6/1994 | Martinez ............... 725/62 |
| 5,010,485 A | 4/1991 | Bigari | 5,323,315 A | 6/1994 | Highbloom |
| 5,014,267 A | 5/1991 | Tompkins et al. ............... 370/62 | 5,323,445 A | 6/1994 | Nakatsuka |
| 5,020,129 A | 5/1991 | Martin et al. | 5,325,194 A | 6/1994 | Natori et al. ............... 348/15 |
| 5,021,953 A | 6/1991 | Webber et al. | 5,327,508 A | 7/1994 | Deaton et al. |
| 5,032,989 A | 7/1991 | Tornetta | 5,329,578 A | 7/1994 | Brennan et al. |
| 5,042,062 A | 8/1991 | Lee et al. | 5,335,277 A | 8/1994 | Harvey et al. |
| 5,043,889 A | 8/1991 | Lucey | 5,341,374 A | 8/1994 | Lewen et al. ............... 370/85.4 |
| 5,053,956 A | 10/1991 | Donald et al. | 5,347,632 A | 9/1994 | Filepp et al. |
| 5,053,957 A | 10/1991 | Suzuki | 5,351,133 A | 9/1994 | Blonstein |
| 5,056,019 A | 10/1991 | Schultz et al. | 5,351,186 A | 9/1994 | Bullock et al. |
| 5,056,136 A | 10/1991 | Smith ............... 380/10 | 5,353,218 A | 10/1994 | De Lapa et al. |
| 5,060,068 A | 10/1991 | Lindstrom | 5,353,219 A | 10/1994 | Mueller et al. |
| 5,061,916 A | 10/1991 | French et al. | 5,361,199 A | 11/1994 | Shoquist et al. |
| 5,063,507 A | 11/1991 | Lindsey et al. | 5,365,577 A | 11/1994 | Davis et al. |
| 5,065,393 A | 11/1991 | Sibbitt et al. | 5,367,273 A | 11/1994 | Georger et al. ............... 333/1 |
| 5,072,103 A | 12/1991 | Nara | 5,369,571 A | 11/1994 | Metts |
| 5,077,665 A | 12/1991 | Silverman et al. | 5,371,534 A | 12/1994 | Dagdeviren et al. |
| 5,077,788 A | 12/1991 | Cook et al. | 5,375,055 A | 12/1994 | Togher et al. |
| 5,091,933 A | 2/1992 | Katz | 5,381,412 A | 1/1995 | Otani ............... 370/84 |
| 5,093,718 A | 3/1992 | Hoarty et al. | 5,382,972 A | 1/1995 | Kannes ............... 348/15 |
| 5,101,353 A | 3/1992 | Lupien et al. | 5,384,841 A | 1/1995 | Adams et al. |
| 5,109,399 A | 4/1992 | Thompson | 5,388,165 A | 2/1995 | Deaton et al. |
| 5,109,414 A | 4/1992 | Harvey et al. | 5,392,223 A | 2/1995 | Caci ............... 364/514 |
| 5,117,354 A | 5/1992 | Long et al. | 5,402,336 A | 3/1995 | Spiegelhoff et al. |
| 5,127,049 A | 6/1992 | Sabo | 5,406,324 A | 4/1995 | Roth ............... 348/22 |
| 5,136,501 A | 8/1992 | Silverman et al. | 5,410,343 A | 4/1995 | Coddington et al. |
| 5,136,581 A | 8/1992 | Muehrcke | 5,412,416 A | 5/1995 | Nemirofsky ............... 348/10 |
| 5,146,404 A | 9/1992 | Calloway et al. | 5,412,708 A | 5/1995 | Katz |
| 5,151,782 A | 9/1992 | Ferraro | 5,426,281 A | 6/1995 | Abecassis |
| 5,164,979 A | 11/1992 | Choi | 5,440,336 A | 8/1995 | Buhro et al. |
| 5,164,982 A | 11/1992 | Davis | 5,440,624 A | 8/1995 | Schoof et al. |
| 5,168,445 A | 12/1992 | Kawashima et al. | 5,442,688 A | 8/1995 | Katz |
| 5,168,446 A | 12/1992 | Wiseman | 5,442,771 A | 8/1995 | Filepp et al. |
| 5,170,427 A | 12/1992 | Guichard et al. | 5,450,123 A | 9/1995 | Smith |
| 5,173,851 A | 12/1992 | Off et al. | 5,451,998 A | 9/1995 | Hamrick |
| 5,191,410 A | 3/1993 | McCalley et al. | 5,452,289 A | 9/1995 | Sharma et al. ............... 370/32 |
| 5,191,613 A | 3/1993 | Graziano et al. | 5,455,903 A | 10/1995 | Jolissaint et al. |
| 5,193,056 A | 3/1993 | Boes | 5,465,291 A | 11/1995 | Barrus et al. |
| 5,195,092 A | 3/1993 | Wilson et al. ............... 370/94.2 | 5,475,585 A | 12/1995 | Bush |
| 5,199,062 A | 3/1993 | Von Meister et al. | 5,481,294 A | 1/1996 | Thomas et al. |
| 5,201,010 A | 4/1993 | Deaton et al. | 5,481,605 A | 1/1996 | Sakurai et al. |
| 5,202,759 A | 4/1993 | Laycock | 5,485,370 A | 1/1996 | Moss et al. |

| | | |
|---|---|---|
| 5,490,060 A | 2/1996 | Malec et al. |
| 5,491,797 A | 2/1996 | Thompson et al. ............ 395/200 |
| 5,495,284 A | 2/1996 | Katz |
| 5,500,793 A | 3/1996 | Deming, Jr. et al. |
| 5,502,636 A | 3/1996 | Clarke |
| 5,515,424 A | 5/1996 | Kenney |
| 5,528,281 A | 6/1996 | Grady et al. |
| 5,528,513 A | 6/1996 | Vaitzblit et al. |
| 5,534,912 A | 7/1996 | Kostreski |
| 5,537,590 A | 7/1996 | Amado |
| 5,539,448 A | 7/1996 | Verhille et al. |
| 5,557,518 A | 9/1996 | Rosen |
| 5,568,181 A | 10/1996 | Greenwood et al. |
| 5,576,951 A | 11/1996 | Lockwood |
| 5,581,479 A | 12/1996 | McLaughlin et al. |
| 5,583,763 A | 12/1996 | Atcheson et al. |
| 5,583,928 A | 12/1996 | Tester et al. |
| 5,592,375 A | 1/1997 | Salmon et al. |
| 5,602,905 A | 2/1997 | Mettke |
| 5,602,908 A | 2/1997 | Fan |
| 5,604,487 A | 2/1997 | Frymier |
| 5,606,359 A | 2/1997 | Youden et al. |
| 5,606,496 A | 2/1997 | D'Agostino |
| 5,621,812 A | 4/1997 | Deaton et al. |
| 5,630,068 A | 5/1997 | Vela et al. |
| 5,644,723 A | 7/1997 | Deaton et al. |
| 5,682,195 A | 10/1997 | Hendricks et al. |
| 5,684,870 A | 11/1997 | Maloney et al. |
| 5,689,553 A | 11/1997 | Ahuja et al. |
| 5,710,887 A | 1/1998 | Chelliah et al. |
| 5,712,906 A | 1/1998 | Grady et al. |
| 5,721,832 A | 2/1998 | Westrope et al. |
| 5,724,646 A | 3/1998 | Ganek et al. |
| 5,727,164 A | 3/1998 | Kaye et al. |
| 5,729,594 A | 3/1998 | Klingman ................. 379/93.12 |
| 5,740,035 A | 4/1998 | Cohen et al. |
| 5,742,931 A | 4/1998 | Spiegelhoff et al. |
| 5,758,328 A | 5/1998 | Giovannoli |
| 5,793,413 A | 8/1998 | Hylton et al. |
| 5,794,207 A | 8/1998 | Walker et al. |
| 5,796,967 A | 8/1998 | Filepp et al. |
| 5,815,146 A | 9/1998 | Youden et al. |
| 5,845,265 A | 12/1998 | Woolston |
| 5,870,724 A | 2/1999 | Lawlor et al. |
| 5,884,272 A | 3/1999 | Walker et al. ...................... 705/1 |
| 5,905,973 A | 5/1999 | Yonezawa et al. |
| 5,937,086 A | 8/1999 | Taguchi ........ 382/165 |
| 5,973,722 A | 10/1999 | Wakai et al. |
| 6,072,402 A | 6/2000 | Kniffin et al. ............ 340/825.31 |
| 6,157,711 A | 12/2000 | Katz |
| 6,323,894 B1* | 11/2001 | Katz ........................... 348/14.08 |
| 6,418,211 B1 | 7/2002 | Irvin |
| 6,608,636 B1 | 8/2003 | Roseman ...................... 345/753 |
| 6,802,062 B1 | 10/2004 | Oyamada et al. ................. 718/1 |
| 7,072,849 B1 | 7/2006 | Filepp et al. |
| 7,835,508 B1* | 11/2010 | Katz .......................... 379/93.12 |
| 7,835,509 B2* | 11/2010 | Katz ........................... 379/93.12 |
| 7,839,984 B2* | 11/2010 | Katz ........................... 379/93.12 |
| 7,848,496 B2* | 12/2010 | Katz ........................... 379/93.12 |
| 2002/0120554 A1 | 8/2002 | Vega ............................. 705/37 |

FOREIGN PATENT DOCUMENTS

| | | |
|---|---|---|
| EP | 0 010 399 A1 | 4/1980 |
| EP | 0 188 286 | 7/1986 |
| EP | 0265083 A1 | 9/1987 |
| FR | 2 658 635 A1 | 8/1991 |
| GB | 1437883 | 6/1976 |
| GB | 1 504 112 | 3/1978 |
| GB | 1 504 113 | 3/1978 |
| GB | 1504112 | 3/1978 |
| GB | 1504113 | 3/1978 |
| GB | 2 105 075 A | 3/1983 |
| GB | 1 437 883 | 6/1986 |
| JP | Sho 50-98626 | 1/1974 |
| JP | Sho 49-73198 | 7/1974 |
| JP | Sho 50-133892 | 10/1975 |
| JP | Sho 52-72800 | 11/1975 |
| JP | Sho 50-133892 | 10/1976 |
| JP | Sho 54-60000 | 5/1979 |
| JP | Sho 57-92254 | 11/1980 |
| JP | Sho 57-92254 | 6/1982 |
| JP | 62-190552 | 8/1987 |
| JP | 0 029 456 | 2/1991 |
| JP | 0 109 198 | 4/1991 |
| WO | WO 89/02139 | 3/1989 |
| WO | WO 92/15174 A1 | 9/1992 |

OTHER PUBLICATIONS

"American, IBM, American Express to Test Automatic Ticket Vendor," *Aviation Daily*, Oct. 30, 1969.

Andrade, Juan M., et al. "Open On-line Transaction Processing With The TUXE DO System," *UNIX System Laboratories, Digest of Papers Compcon Spring 1992*, IEEE Computer Society Press, Feb. 24-28, 1992, pp. 366-371.

Andrews, E.L., "FCC Plan to Set Up 2-Way TV," *The N ew York Times*, Business Day, Jan. 11, 1991, p. C1.

Angiolillo, J., et al., "Personal Visual Co mmunications Enters the Market Place," *Visual Communications, AT&T Technology Products, Systems and Services*, vol. 7, No. 3, Fall 1992, pp. 18-28.

Applebaum, Simon, "Two-Way Tele vision," *CableVision*, Aug. 8, 1983, p. 66.

Arnbak, J., "ISD N: Innovative Services or Innovative Technology?" *Proceedings of the IFIP TC 6/ICCC Joint Conference on ISDN in Europe*, Apr. 25-27, 1989, pp. 45-51 and pp. 405-411.

"AT&T Picasso Phone Still-I mage Phone Gets New Secure Capability," *AT&T News Release*, Jun. 7, 1994.

"Picasso Phone Sends High-Quality Over Ordinary Lines " *AT&T News Release*, May 11, 1993.

Brand, Stewart "Founding Father," *Wired*, Mar. 9, 2001.

Brittan, David, "Being There the Promise of Multimedia Communications," *Technology Review*, May/Jun. 1992, pp. 44-50.

Broom, Michael, "AT&T La unches Online Buying for Wireless Products and Services; Largest Wireless Carrier to Offer Automated Online Store," *Business Wire*, Oct. 29, 1998.

Cheung, J.B., et al. "IS DN: Evolutionary Step to Integrated Access and Transport Services," *AT&T Bell Laboratories Record*, Nov. 1985.

Del Rosso, Laura, "Marketel Says it Plans to Launch Air Fare 'Auction' in June," Tr *avel Weekly*, Apr. 29, 1991.

Del Rosso, Laura, "Tic ket-Bidding Firm Closes Its Doors," *Travel Weekly*, Mar. 12, 1992.

Delatore, J.P., et al., "IS DN Data Networking Applications in the Corporate Environment," *AT&T Technical Journal*, vol. 67, No. 6, Nov./Dec. 1988, pp. 107-120.

"Elect ronic In-Home Shopping: Our Stores are Always Open," *Chain Store Age Executive*, Mar. 1985, pp. 111, 116.

Ellis, M.L., et al., "I NDAX: An Operational Interactive Cabletext System," *IEEE Journal on Selected Areas in Communications*, vol. SAC-1, No. 2, Feb. 1983, pp. 285-293.

Englander, A.C., et al. "Cr eating Tomorrow's Multime dia Systems Today," *Visual Communications, AT&T Technology Products, Systems and Services*, vol. 7, No. 3, Fall 1992, pp. 24-30.

Ericson, D., et al., "New Concepts of Addressability," *Pay Per Views*, Dec. 1989, vol. 3, No. 1, pp. 8, 10, 12-14.

Francas, M., et al., "Input D evices for Public Videotex Services," *Human-Computer Interaction—INTERACT '84*, Proceedings of the IFIP Conference Sep. 4-7, 1984, pp. 171-175.

Fry, Jason, "Bu ying the Goods, Person to Person," *The Wall Street Journal*, Dec. 7, 1998.

Golden, Fran, "AAL 's Riga Doubts Marketel's Appeal to Retailers," *Travel Weekly*, Nov. 13, 1999.

Gould, D., "Audio Response Units," *Pay Per Vie ws*, Sep. 1989, pp. 19-20, 22.

Heidkamp, Martha M., "R eaping the Benefits of Financial EDI," *Management Accounting*, May 1991, pp. 2-3, 39-43.

"ICS Launches N ew In-Home Interactive Video Service Package," *CableVision*, Sep. 3, 1984, pp. 71, 73.

*ISDN Reference Manual (Integrated Services Digital Network)*, AT&T, Jul. 1987 (Manual).

*ISDN Strategies*, vol. 1, No. 1, Jul. 1986.

*ISDN Strategies*, vol. 2, No. 3, Mar. 1987.

*ISDN Strategies*, vol. 3, No. 12, Dec. 1988.

*ISDN Strategies*, vol. 4, No. 1, Jan. 1989 through vol. 4, No. 7, Jul. 1989.

Kuhl, C., "Operators' Han dbook The PPV Billing Challenge is Keeping it Simple While Obtaining Valuable Marketing Information," *CableVision*, Jan. 15, 1990, pp. 49, 52.

Kuttner, Robert, "Computer s May Turn the World Into One Big Commodities Pit," *Business Week*, Sep. 11, 1989.

Lachenbruch, D., "Video News," *Radio Electronics*, Dec. 1989.

Long, J., "Transaction Processing Using Videotex or Shopping on Prestel," Human-Computer Interaction—INTERACT '84, Proceedings of the IFIP Conference, Sep. 4-7, 1984, pp. 251-255.

"AT&T Recei ves FDA Approval to Market Picasso as Diagnostic Tool," *Lucent Technologies Press Release*, Mar. 9, 1995.

Pelline, Jeff, "Tra velers Bidding on Airline Tickets: Sf Firm Offers Chance for Cut-Rate Fares," *San Francisco Chronicle*, Section A4, Aug. 19, 1991.

Perry, Y., "Data Communications in the ISDN Era," *Pro ceedings of the IFIP TC6 First International Conference on Data Communications in the ISDN Era*, Mar. 4-5, 1985.

"Profit from Impulse Pay-Per-View," *Telephony*, Jul. 14, 1986 (Advertisement).

"Ref. FCC Tariff Nos. 2, 4, 9," Apr. 1988 (Article).

Ritter, Jeffrey B., "Scope of the Uniform Commercial Code: Computer Contracting Cases and Electronic Commercial Practice," 45 Bus. Law.2533,2535 (Aug. 1990).

Schrage, Michael, "An E xperiment in Economic Theory; Labs Testing Real Markets," *The Record*, Section B1, Nov. 26, 1989.

"Shopping Via a Networ k is no Longer Just Talk," *Data Communications*, Aug. 1981, p. 43.

Spiedel, Richard E., "Impact of Electronic Contracting on Contract Formation Under Revised UCC Article 2, Sales", C878 ALI-ABA 335 (Dec. 9, 1993).

"Syst em Will Enable Customer to Establish Prebilled 'Credit Bank'," *Communications Daily* , Aug. 15, 1990.

Takei, Daisuke, "Videote x Information System and Credit System Connecting with MARS-301 of JNR," *Japanese Railway Engineering*, No. 95, Sep. 1985, pp. 9-11.

Wright, Peter, "Vision by Telephone," *Computer Syst ems*, No. 1, Jan. 6, 1986.

"Wurlitze r Card Control: Unveiled at the Recent National Automatic Merchandising Association Convention Was This Magnetic Card Vending System From Deutsche Wurlitzer GmbH," *Vending Times*, Nov. 1979 (Article).

Yager, T., "Bett er Than Being There," *Byte*, No. 3, Mar. 18, 1993.

Zilles, S.N. "Catalog-Based Order Entry System," *IBM technical Disclosure Bulletin*, vol. 25, No. 11B, Apr. 1983, pp. 5892-5893.

"Digital Image Communications at the Practical Stage," *Nikkei Communications*, Nikkei BP, May 4, 1992, No. 125, pp. 31-37.

Ishii, "Multimedia System Which Will Exercise the Greatest Power in Business Use," *Nikkei Computer*, Aug. 12, 1991, No. 260, pp. 93-102.

Takahashi, Unipher, "Placing the Order After Checking Pictures of Goods with a Terminal at a Jewelry Store," *Nikkei Computer*, May 4, 1992, No. 280, pp. 80-90.

Hayes, Mary, "Videophone suits seek $110 million," *The Business Journal—San Jose*, Mar. 8, 1993, 2 pages.

Lam, Jenny, "Cosy offices," *The Straits Times Press Limited*, Mar. 4, 1993, 2 pages.

"Telecoms future: personal communication networks," *South China Morning Post (Hong Kong)*, Feb. 24, 1993, 2 pages.

Troxler, Howard, "Cousin of cable—or just Big Brother?," *St. Petersburg Times (Florida)*, Feb. 3, 1993, 2 pages.

Strattner, Anthony, "Video pictures: coming from a telephone near you; AT&T teams with CLI for chip sets that deliver video over phone; Compression Labs Inc.; Product Announcement," *Computer Shopper*, Feb. 1, 1993, 2 pages.

Baron, David, et al., "CLI demos video phone over ISDN; Compression Labs; Integrated systems digital network; News from CES and MacWorld; Brief Article," *Digital Media*, Jan. 18, 1993, 1 page.

"ShareVision Announces Share View TM Plus," *News Release*, Jan. 6, 1993, 1 page.

Behlim, Saara, "Patent of the month: They're all connected," *Crain's Chicago Business*, Dec. 14, 1992, 1 page.

P. Young, "But Will it Respect You Later?," *Sunday Mail (QLD)*, Dec. 13, 1992, 1 page.

Forster, Barbara, "'Videoconferencing' Evolving Into Valuable Business Tool," *Central New York Business Journal*, Nov. 16, 1992, 2 pages.

Maloney, Janice, et al., "Better than being there? Share Vision provides document sharing, livevideo and audio over standard phone lines.; ShareVision Technology Inc.'s technology for producing desktop visual communications systems," *Internet Media Strategies, Inc. Digital Media*, Aug. 17, 1992, 2 pages.

M. Ketchell, "Building Towards 2000," *Courier-Mail*, Mar. 10, 1992, 1 page.

"Visual communications systems offer high definition, cost," *The Nikkei Weekly (Japan)*, Nihon Keizai Shimbun, Inc., Sep. 28, 1991, 1 page.

Alliance Teleconferencing Services Boost Business Efficiency, 1988, Hazto, et al., AT&T Technology, vol. 3 No. 1, pp. 22-31.

Tempo MBX Feature Guide, 1989, ConferTech International, Inc. General Description, Installation & Maintenance Practice, C1200 Computerized Teleconference Terminal, 1990, Westell, Inc.

Interactive Graphics Teleconferencing, 1979, Pferd et al., Computer, vol. 12, No. 11, pp. 62-72.

Behavioral and User Needs for Teleconferencing, 1985, Kenyon et al., Proceedings of the IEEE, vol. 73, No. 4; pp. 689-699.

Audio and Visually Augmented Teleconferencing, 1985, Watanabe et al., 73 Proceedings of the IEEE 4; pp. 656-670.

C1200 Computerized Teleconference Bridge, 1983, Westell, Inc.

General Transmission Considerations in Telephone Conference Systems, 1968, Mitchell, Doren, IEEE Transactions on Communication Technology, vol. COM-16, No. 1; Feb. 1968; pp. 163-167.

Packet Switched Voice Conferencing Across Interconnected Networks, 1988, Weiss et al., Proceedings of the 13$^{th}$ Conference on Local Computer Networks; 1 pp. 114-124.

Bridge on The River Telecom, May 1989, Teleconnect, v7, n5, 1 p. 110(4).

Implementation Mechanisms for Packet Switched Voice Conferencing, 1989, Ziegler et al., IEEE Journal on Selected Areas in Communications, vol. 7, No. 5, pp. 698-706.

LAN Based Real Time Audio-Graphics Conferencing System, Apr. 1989, Soares et al., INFOCOM '89. IEEE Proceedings of the Eighth Annual Joint Conference of the IEEE Computer and Communications, Societies, Technology: Emerging or Converging, vol. 2; Apr. 23-27, 1989; pp. 617-623.

Videomatic Switching: Systems and Services, Mar. 1988, Crawford et al., International Zurich Seminar on Digital Communications, 1988. 'Mapping New Applications onto New Technologies'; Mar. 8-10, 1988; pp. 37-43.

Real-Time Desktop Conference System Based on Integrated Group Communication Protocols, Mar. 1988, Sakata et al., Conference Proceedings, Seventh Annual International Phoenix Conference on Computers and Communications; Mar. 16-18, 1988; pp. 379-384.

Today's Teleconferencing and Its Applications, May 1983, Ryva, 33rd IEEE Vehicular Technology Conference; May 25-27, 1983; pp. 99-103.

A Secure Audio Teleconference System, Oct. 1988, Steer et al., IEEE Military Communications Conference, 1988. MILCOM SS. 'Conference record. '21$^{st}$ Century Military Communications—What's Possible?', vol. 1; Oct. 23-26, 1988; pp. 63-67.

Networking Requirements of the Rapport Multimedia Conferencing System, 1988, Ahuja et al., INFOCOM '88. Networks: Evolution or Revolution? IEEE Proceedings. Seventh Annual Joint Conference of the IEEE Computer and Communications Societies; 1988; pp. 746-751.

Technical Implications of Teleconference Service, Jan. 1975, McManamon, IEEE Transactions on Communications, vol. COM-23, No. 1; Jan. 1975; pp. 30-38.

Personal Multi-Media Multi-Point Communication Services for Broadband Networks, Dec. 1988, Addeo et al., IEEE Global Telecommunications Conference, 1988, and Exhibition. 'Communications for the Information Age.' Conference Record, GLOBECOM '88, vol. 1; Nov. 28-Dec. 1, 1988; pp. 53-57.

Multidisciplinary Applications of Communication Systems in Teleconferencing and Education, Oct. 1975, Coll et al., IEEE Transactions on Communications, vol. COM-23, No. 10; Oct. 1975; pp. 1104-1118.

ANI is the key to unlock advanced network services, Nov. 1988, Hegebarth, Telephony, v215.n20; Nov. 14, 1988; pp. 64-66.

AT&T plans 2 nationwide ISDN features, Apr. 1988, Electronic News, 1,v34.n1701; Apr. 11, 1988; pp. 21.

Cable operators fight back (pay-per-view TV), Feb. 1987, Stern, Dun's Business Month, v129; Feb. 1987; pp. 54-55.

Unscrambling PPV options (pay-per-view TV), Aug. 1988, Sukow, Broadcasting, v115.n8;Aug. 22, 1988; pp. 39-40.

Data peps up the old voice lines (voice data technology), Sep. 1988, Kulkosky, Wall Street Computer Review, v5.n12; Sep. 1988; pp. 53-59.

Calling Card Service—Overall Description and Operational Characteristics, Sep. 1982, Basinger et al., The Bell System Technical Journal, vol. 61, No. 7; Sep. 1982; pp. 1655-1673.

Calling Card Service—TSPS Hardware, Software, and Signaling Implementation, Sep. 1982, Confalone et al., The Bell System Technical Journal, vol. 61, No. 7; Sep. 1982; pp. 1675-1714.

Calling Card Service—Human Factors Studies, Sep. 1982, Eigen et al., The Bell System Technical Journal, vol. 61, No. 7; Sep. 1982; pp. 1715-1735.

Mass Announcement Capability, Jul. 1981, Frank et al., The Bell System Technical Journal, vol. 60, No. 6; Jul.-Aug. 1981; pp. 1049-1081.

Mass Announcement Subsystem, Jul. 1981, Anderson et al., The Bell System Technical Journal, vol. 60, No. 6; Jul.-Aug. 1981; pp. 1083-1108.

Hello, central; phone conferencing tips, Jan. 1989, Jaffe, Whole Earth Review, No. 65; ISSN: 0749-5056; Jan. 1989; p. 110.

Why not try "audio teleconferencing"?, Oct. 1987, Menkus, Modern office Technology, vol. 32; Oct. 1987; pp. 124-126.

Dial-It 900 Service Users Guide, AT&T.

AT&T teleconference offerings, 1987, Douglas, IDATE.

Tempo Audio Teleconferencing System Operating Manual, 1990, ConferTech International.

A History of Alliance Teleconferencing Service, Feb. 1990, Elfrank, AT&T.

A packet-switched multimedia conferencing system, Jan. 1989, Schooler et al., SIGOIS (ACM Special Interest Group on Office Information Systems) Bulletin, vol. 1 No. 1 10, pp. 12-22, Jan. 1989.

CDR 1024, "The ConferCall Service", 1984-86, ConferTech International, Inc.

The New Tempo-MB, The Best Just Keeps Getting Better, 1986, ConferTech International, Inc.

Tempo MBX Product Information Sheet, 1989, ConferTech International, Inc.

Tempo MBX Feature Guide, "Conferee Features", 1989, ConferTech International, Inc.

Tempo MBX Summary of System Features, 1989, ConferTech International, Inc.

Darome's Model 3015/3030 Bridge System, Feature Description and offer for sale, Apr. 1986, Darome.

A Multiport Telephone Conference Bridge, Feb. 1968, Kuebler, IEEE Transactions on Communication Technology, vol. Com-16, No. 1 (Feb. 1968) pp. 168-172.

VCT Quarterly Newsletter, 1987.

Alliance Teleconferencing Services, AT&T, 1985.

Alliance Teleconferencing Services, AT&T Alliance Teleconferencing Services: A Guidebook to Effective Teleconferncing, 1984.

AT&T Alliance Teleconferencing Services—Call Set Up Cards.

European Patent Office Search Report, from EP Application No. 05015139.8, dated Nov. 13, 2009.

Gelman, A.D., et al., "A Store-and-Forward Architecture for Video-on-Demand Service," 1991 IEEE, pp. 842-846.

Gardner, W. David, "Computer Users Have Hundreds of Data Bases to Choose From," Dun's Business Month, Apr. 1983, pp. 99-100.

Veit, Stan, "The Computer Network Maze, Part 2: Concluding a description of how the various computer communications networks can be utilized to your best advantage," Computers & Electronics, vol. 21, No. 4, Apr. 1983, pp. 84-90.

Globecom '82, IEEE Global Telecommunications Conference, Conference Record vol. 3 of 3, Miami, Nov. 29 to Dec. 2, 1982.

Comp-U-Store System Could Change Retail Economics, Direct Marketing, vol. 46, No. 3, Jul. 1983, pp. 101-107.

Anonymous; "New replacement Service Saves Insurers Money, Satisfies Insured"; Canadian Insurance; Toronto; Aug. 1982; extracted on Internet from Proquest database.

Baran, Paul, Some Changes in Information Technology Affecting Marketing in the Year 2000, Changing Marketing Systems, 1967 Winter Conference, Dec. 27-29, 1967, pp. 76-87, No. 26. (or pp. 76-77).

Britton, David, "Being There—The Promise of Multimedia Communications", Technology Review, (May 16, 1992,) pp. 43-50, May/Jun. 1992.

Levine, Kay, Anchorage Daily News, Troubleshooter; [Final Edition 30]. Anchorage, Alaska. Jul. 16, 1991. p. B.2.

Nash, Edward L., "Direct Marketing, Strategy, Planning, Execution", $3^{rd}$ Edition, McGraw-Hill, Inc., 1994, pp. 164-165, 364-367.

Peppers et al., "The One to One Future Building Relationships One Customer at a Time", © 1993, 1996, pp. 3-17; 40-43.

Resnick, Paul, GroupLens: An Open Architecture for Collaborative Filtering of Netnews, Proceedings of the ACM 1994 Conference on Computer Supported Cooperative Work, Abstract, pp. 175-186.

Robinson, Phillip; "Laptop and palmtop computers have disadvantages but also some nice pluses"; Austin American Statesman; Austin, Tex; Mar. 9, 1992 extracted on Internet from Proquest Database.

Online Review, vol. 3, No. 2, 1979, pp. 140-141 (Article).

MCA Discovision, 1979 (Manual/Brochure).

"Wurlitzer Card Control: Unveiled at the recent National Automatic Merchandising Association convention was this magnetic card vending system from Deutsche Wurlitzer GmbH," Vending Times, Nov. 1979 (Article).

"Auerbach on Data Collection Systems," 1972, Chapters 3, 4, 5, 13 (Chapters from a Book).

"American, IBM, American Express to Test Automatic Ticket Vendor," Aviation Daily, Oct. 30, 1969 (Article).

Rusche, J., "Business Programming for the Video Disc," pp. 118-137 (Chapters from a Book).

*ISDN Strategies*, 1986 (Article).

*ISDN Strategies*, vol. 1, No. 1, Jul. 1986 (Article).

*ISDN Strategies*, vol. 2, No. 3, Mar. 1987 (Article).

*ISDN Strategies*, vol. 3, No. 12, Dec. 1988 (Article).

*ISDN Strategies*, vol. 4, No. 1, Jan. 1989 through vol. 4, No. 7, Jul. 1989 (Article).

Kim, B.G., "Current Advances in LANs, MAN's & ISDN," 1989, Chapter 4 (Chapter of a Book).

"Introduction to ISDN," *Online Publications*, 1987, pp. 1-79 (Tutorial Paper).

Arnbak, J., "ISDN: Innovative Services or Innovative Technology?," *Proceedings of the IFIP TC 6/ICCC Joint conference on ISDN in Europe*, Apr. 25-27, 1989, pp. 45-51, pp. 405-411 (Article).

Bocker, P., "ISDN The Integrated Services Digital Network," 1988, pp. 1-52 (Article).

Perry, Y., "Data Communications in the ISDN Era," *Proceedings of the IFIP TC6 First International Conference on Data Communications in the ISDN Era*, Mar. 4-5, 1986 (Article).

Gawrys, G.W., "Ushering in the Era of ISDN," *AT&T Technology*, vol. 1, No. 1, 1986, pp. 2-9 (Article).

Herr, T.J., "ISDN Applications in Public Switched Networks," *AT&T Technology*, vol. 2, No. 3, 1987, pp. 56-65 (Article).

Delatore, J.P., et al., "ISDN Data Networking Applications in the Corporate Environment," *AT&T Technical Journal*, vol. 67, No. 6, Nov./Dec. 1988, pp. 107-120 (Article).

Kauza, J.J., "ISDN: A Customer's Service," *AT&T Technology*, vol. 4, No. 3, 1989, pp. 4-11 (Article).

Cheung, J.B., et al., "ISDN: Evolutionary step to integrated access and transport services," *Record*, Nov. 1985, (Article).

"Ref. FCC Tariff Nos. 2, 4, 9," Apr. 5, 1988 (Article).

"An ISDN Primer: Technology and Network Implications," *Business Communications Review*, 1986 (Article).

Zilles, S.N., "Catalog-Based Order Entry System," *IBM Technical Disclosure Bulletin*, vol. 25, No. 11B, Apr. 1983, pp. 5892-5893 (Article).

Kamin, I., *Questions and Answers About TV*, 1983, Chapters 4-7 (Chapter of a Book).
Lachenbruch, D., "Video News," *Radio-Electronics*, Dec. 1989 (Article).
Ericson, D. et al., "New Concepts of Addressability," *PayPerViews*, vol. 1, No. 1, Dec. 1989, pp. 8-14.
Gould, D., "Audio Response Units," *PayPerViews*, Sep. 1989, pp. 19-20, 22 (Article).
Kuhl, C., "Operators' Handbook The PPV billing challenge is keeping it simple while obtaining valuable marketing information," *Cablevision*, 49, Jan. 15, 1990, pp. 49, 52 (Article).
Neville, T. et al., "The Application of National ANI to Pay-Per-View Ordering," *1988 NCTA Technical Papers*.
"System will enable customer to establish prebilled 'credit bank'," *Communications Daily*, Aug. 15, 1990 (Article).
Andrews, E.L., "FCC Plan to set Up 2-Way TV," *The New York Times*, Business Day, Jan. 11, 1991, pp. C1 (Article).
Ackerman, Lorrie F., et al., "The Video Phone: New Life for an Old Idea?," Apr. 1992, pp. 1-47—(Paper).
Andrade, Juan M., et al. "Open On-line Transaction Processing with the TUXEDO System," digest of papers Compcon Spring 1992, IEEE Computer Society Press, Los Alamitos, California, pp. 366-371—(Article).
Angiolillo, J., et al., "Personal Visual Communications Enters the Market Place," *Visual Communications, AT&T Technology Products, Systems and Services*, vol. 7, No. 3, fall 1992, pp. 18-28—(Article).
Applebaum, Simon, "Two-way television" *Cable Vision*, Aug. 8, 1983, p. 66—(Article).
AT&T News Release, "AT&T Picasso Phone Still-Image Phone gets new secure capability," Tuesday, Jun. 7, 1994, pp. 1-2—(News release).
AT&T News Release, "Picasso phone sends high-quality images over ordinary lines," Tuesday, May 11, 1993, pp. 1-5—(News release).
Bowen, Charles, et al. *How to Get the Most Out of CompuServe*, 5th edition, 1993, Table of Contents (pp. v-xxi); "CompuServe Mail" (pp. 50-55); Chapter 12 ("Shopping", pp. 283-299), Appendix (pp. 453-455)—(Chapters from book).
Brittan, David, "*Being There* The Promise of Multimedia Communications," Technology Review, May/Jun. 1992, pp. 44-50—(Article).
Broom, Michael, "AT&T Launches Online Buying for Wireless Products and Services; Largest Wireless Carrier to Offer Automated Online Store," Business Wire, Thursday, Oct. 29, 1998—(Article).
Cerbone, R., "The Coming HDTV Wave," *Visual Communications, AT&T Technology Products, Systems and Services*, vol. 7, No. 3, fall 1992, pp. 14-17—(Article).
Del Rosso, Laura, "Marketel Says it Plans to Launch Air Fare 'Auction' in June," Travel Weekly, Apr. 29, 1991.
Del Rosso, Laura, "Ticket-Bidding Firm Closes it Doors," Travel Weekly, Mar. 12, 1992.
"Electronic in-home shopping: Our stores are always open," Chain Store Age Executive, Mar. 1985, pp. 111, 116—(Article).
Ellis, M.L., et al., "INDAX: An Operational Interactive Cabletext System," IEEE Journal on Selected Areas in Communications, vol. SAC-1, No. 2, Feb. 1983, pp. 285-293—(Article).
Englander, A.C., et al. "Creating Tomorrow's Multimedia Systems Today," *Visual Communications, AT&T Technoloay Prodcuts, Systems and Services*, vol. 7, No. 3, fall 1992, pp. 24-30—(Article).
Ensor, J. Robert, et al., "The Rapport Multimedia Conferencing System—A Software Overview," IEEE Magazine, 1988, pp. 52-58—(Article).
Francas, M., et al., "Input Devices for Public Videotex Services", *Human-Computer Interaction—INTERACT '84*, 1985, pp. 171-175—(Paper).
Fry, Jason,"Buying the Goods, Person to Person," Wall Street Journal, Dec. 7, 1998.
GE Information Services brochures (Getting Started on GEIS' EDI Services; Getting Started on The EDI Express System; UPC Express; business card of Marty Costello; EDI Products and Services; Electronic Data Interchange: Your Competitive Edge in Managing Today's Business Cycle; Information Services Agreement; Introduction to Electronic Data Interchange, A Primer).
Godfrey, D., et al., "The Telidon Book—Designing and Using Videotex Systems", pp. 1-103—(Book).
Golden, Fran, "AAL's Riga Doubts Marketel's Appeal to Retailers," Travel Weekly, Nov. 13, 1989.
Harvey, D.E., et al., "Videoconferencing Systems: Seeing is Believing," *Visual Communications, AT&T Technology Produts, Systems and Services*, vol. 7, No. 3, fall 1992, pp. 7-13—(Article).
Haszto, E.D., et al., "Alliance Teleconferencing Services Boost Business Efficiency," AT&T Technology, vol. Three, No. One, pp. 22-31.
Heidkamp, Martha M., "Reaping the Benefits of Financial EDI," Management Accounting, May 1991, pp. 2-3 and 39-43.
"ICS launches new ?—home interactive video service package", *Cable Vision*, Sep. 3, 1984, pp. 71/73—(Article).
Kuttner, Robert, "Computers May Turn the World into One Big Commodities Pit," Business Week, Sep. 11, 1989.
Long, J., et al., "Transaction Processing Using Videotex or: Shopping on Prestel", *Human-Computer Interaction—INTERACT '84*, 1985, pp. 251-255—(Paper).
Lucent Technologies Press Release, "AT&T receives FDA approval to market Picasso as diagnostic tool," Thursday, Mar. 9, 1995—(Press release).
Miller, Michael, *Using CompuServe*, 2nd Edition, 1994, Contents at a Glance/Introduction (9 pages); Chapter 12 ("Beyond CompuServe: E-mailing Other On-Line Services," pp. 172-177); Chapter 13 ("Minding Your Manners: E-mail Etiquette," pp. 180-185) + drawing figure; Chapter 14 (Just What is This Internet Thing?, pp. 190-195); Chapter 15 ("E-mailing From CompuServe to the Internet," pp. 198-207); Chapter 16 ("Forums on the Internet: USENET News Groups," pp. 210-221); Chapter 17 ("Files on the Internet: Using FTP," pp. 223-233); Chapter 18 ("Other Internet Services: Now and in the Future," pp. 235-241, + drawing figure); Chapter 36 ("Find a Pretty Picture," pp. 423-437); Chapter 38 ("Go Shopping," pp. 452-463); Chapter 39 (face page only)—(Chapters from book).
NASDAQ Website Printouts.
Pelline, Jeff, "Travelers Bidding on Airline Tickets: SF Firm Offers Chance for Cut-rate Fares," San Francisco Chronicle, Secton A4, Aug. 19, 1991.
Posko, A.L., "Versatile Services Streamline Global Videoconferencing," *Visual Communications, AT&T Technology Products, Systems and Services*, vol. 7, No. 3, fall 1992, pp. 2-8—(Article).
*Prodigy Made Easy 2nd Edition*, Osborne McGraw Hill, 1993, Table of Contents (6 pages); Forward (pp. xix); Chapter 6 ("Shopping and Other Services", pp. 127-151; Chapter 10 ("I Can't Believe This is Prodigy", pp. 234-239).
Ritter, Jeffrey B., "Scope of the Uniform Commercial Code: Computer Contracting Cases and Electronic Commerical Practices," 45 Bus. Law, 2533 (Aug. 1990).
Schrage, Michael, "An Experiment in Economic Theory; Labs Testing Real Markets," The Record, Secton B1, Nov. 26, 1989.
"Shopping via a network is no longer just talk," Data Communications, Aug. 1981 at 43.
Spiedel, Richard E., "Impact of Electronic Contracting on Contract Formation Under Revised UCC Article 2, Sales," C878 ALI-ABI, 335, Dec. 9, 1993.
Takei, Daisuke, "Videotex Information System and Credit System Connecting with MARS-301 of JNR," Japanese Railway Engineering, No. 95, Sep. 1985, pp. 9-11—(Article).
Teweles, Richard J., et al., *The Stock Market*, 5th Edition, John Wiley & Sons, 1987, Series Preface; Chapter 9 ("The Over-the-Counter Markets", pp. 189-199).
"Web Ventures Presents BookIt!" press release printed from http://www.webventures.com/bookit/ (Web Ventures World Wide Web site) on Dec. 2, 1996.

* cited by examiner

*EXEMPLARY BUYER REQUEST FORM*

```
DATE 12-7-93   TIME 8:45 AM PST  BUYER CO. FOOD 4 LESS  SPECIFIC BUYER LARRY ISHI

VIDEO UNIT 714 668 5335   YOUR REFERENCE # 5127   MERCHANDISE CODE 42361

GENERAL CATEGORY BASIC HEALTH AND BEAUTY AIDS   SPECIAL CATEGORY SHAMPOO & CONDITIONERS

SUBMIT PRESENTATIONS
    REQUEST SPECIFICS

CONDITIONING SHAMPOO FOR THE U.S. MARKET
        PAPAYA BASED
        12 OZ. BOTTLE
        UNDER $2.00 NET COST
        MUST BE AVAILABLE DELIVERED TO FULLERTON, CA. BY 12-18-93, 8:00 AM PST
        MINIMUM 10,000 UNITS
        DATE/TIME OFFERS REQUIRED BY 12-7-93, 3:00 PM (PST)
```

*FIG. 8*

*EXEMPLARY NOTIFICATION RECEIPT*

```
YOUR #5127 RECEIVED, ASSIGNED TELEBUYER #681296
DISTRIBUTED TO 736 VENDERS
```

*FIG. 9*

COMMERCIAL PRODUCT TELEPHONIC ROUTING SYSTEM WITH MOBILE WIRELESS AND VIDEO VENDING CAPABILITY

CROSS REFERENCE TO RELATED APPLICATIONS

This application is a continuation of application Ser. No. 10/323,222, entitled "COMMERCIAL PRODUCT TELEPHONIC ROUTING SYSTEM WITH MOBILE WIRELESS AND VIDEO VENDING CAPABILITY," and filed on Dec. 18, 2002, now abandoned which is a continuation-in-part of application Ser. No. 09/371,212, entitled "METHOD FOR BUYER-SELLER ON-LINE COMMERCE," and filed on Aug. 10, 1999, now U.S. Pat. No. 7,848,496 which is a continuation of application Ser. No. 08/189,405 entitled "COMMERCIAL PRODUCT ROUTING SYSTEM WITH VIDEO VENDING CAPABILITY," and filed on Jan. 27, 1994, which is now U.S. Pat. No. 6,323,894, which is a continuation-in-part of application Ser. No. 08/154,313, entitled "SCHEDULING AND PROCESSING SYSTEM FOR TELEPHONE VIDEO COMMUNICATION" and filed on Nov. 17, 1993, which is now U.S. Pat. No. 5,495,284, which is a continuation-in-part of application Ser. No. 08/067,783, entitled "VIDEOPHONE SYSTEM FOR SCRUTINY MONITORING WITH COMPUTER CONTROL" and filed on May 25, 1993, now abandoned, which is a continuation-in-part of application Ser. No. 08/031,235, entitled "VIDEOPHONE SYSTEM FOR SCRUTINY MONITORING WITH COMPUTER CONTROL" and filed on Mar. 12, 1993, which is now U.S. Pat. No. 5,412,708. The subject matter in all the above-identified co-pending, linked and commonly owned applications is incorporated herein by reference.

FIELD OF THE INVENTION

The present invention relates generally to systems involving computer telephone integration with video communication, and more particularly, to a communication traffic control system for providing video communication through a mobile wireless and dial-up telephone system that selectively interfaces members of plural groups, as on the basis of subject matter. Specifically, expressed areas of interest for example, may interface inquiring users, such as buyers at mobile wireless telephone terminals with respondent or responder data sites, such as vendor sites. The system may be used in a variety of applications, such as for directing and exchanging inquiries, offers and responses, between selective members of plural groups. For example, select video information may be communicated as a result of processing data to accomplish a selection. Objectives include consummating transactions, as of merchandise and/or services, for example, enabling game shows, dating services, conventions, education and so on.

BACKGROUND OF THE INVENTION

Over the years, the integration of computer and telephone technologies (CIT) has brought about many advances in the telecommunication industry. Functionally integrating human operators with telephone network capabilities, voice and data switching capabilities, computer processing databases, and voice processing technology has not only provided immediate access to information from a wide variety of sources, but has allowed calls to be intelligently and rapidly processed. Telephone switches are linked with computers to coordinate computer information and intelligence with call handling capabilities. Various forms of such expanded communication capabilities are disclosed in U.S. Pat. No. 5,999,525, entitled "Method For Video Telephony Over A Hybrid Network" granted Dec. 7, 1999, to Krishnaswamy, Elliott, Reynolds, Forgy and Solbrig and assigned to MCI Communications Corp., incorporated herein by reference.

Also, developments in computer, telephone and video technologies have introduced the concept of visual communications or video conferencing. In particular, efforts at integrating these technologies have gained momentum in recent years, resulting, in part, from a general desire to conserve time and expenses, and thereby, maximize human efficiency and productivity. The advent of videophones has enabled users to visually communicate from remote locations.

Furthermore, improved video techniques have resulted in systems achieving compatibility and providing compression schemes that can transmit color images over POTS (plain old telephone systems) all over the world. Approaches for incorporating live-action, color video with standard voice telephone lines via networks and modems have been introduced. Video may be received and displayed on a personal computer. Generally, frame rates depend on the type of display and the type of communication hardware. For example, over a normal dial-up telephone line, a computer with a VGA (video graphics array) display set at 32,000 colors, a 486 CPU and a 14.4 kbs (thousand bits per second) modem can achieve a frame rate of 5 frames per second. The link for personal computers can be established in several ways, for example, by a modem, LAN (local area network), or serial port and other high speed digital links. Furthermore, current telephone technology embraces mobile operation with video, voice recognition capability, and extensive Internet communication.

Another aspect of current communication facilities uses online computer service, or the Internet, which now is well established as a collection of interconnected networks using Internet Protocol (IP) for linkage. Specifically, the Transmission Control Protocol/Internet Protocol (TCP/IP) enables a system that is independent of system and architectural differences and is readily available through a variety of telephonic apparatus.

In view of current developments, the present invention recognizes the need for a system to establish select communication for remote locations over a widely distributed area. Using various techniques, as from a central location, the applications discussed above are enabled as well as many other diverse applications with similar requirements. In particular, the present system recognizes the need for selectively directing and exchanging video communications, as between an inquiring person and a responding entity. Such communications might take the form of directing communications, including offers and responses, between select members of plural groups or sub-groups, for example, to enable transactions and billing related to transactions between such groups, all accommodated by computerized telephonic communication techniques and including wireless mobile terminals.

SUMMARY OF THE INVENTION

Generally, the system of the present invention involves computerized control for selective video communication between a plurality of remote, widely distributed locations, through a central unit, utilizing dial-up telephone facilities. Specifically, for example the dynamic graphics of telephonic video (on standard analog lines and digital lines over Integrated ServiceS Digital Network (ISDN) as well as wireless facilities) facilitate video displays along with audio capabilities (as voice recognition), all combined with the interactive capability of computers to attain effective, select, communication with video capability. The central traffic control system facilitates these operations. For example, the central traffic control system may communicate with inquiring-user terminals or responder sites, and selectively interface terminals with sites, accommodating video communication As indicated, the system of the present invention contemplates applications involving inquiries and responses ranging from merchandising (including purchasing, selling, marketing or the like), education, game shows, dating services, employment services, information services and so on. The disclosed embodiments are configured to process data, then selectively direct communication traffic, for example, in the forms of inquiries, invitations, offers and or responses, between members of plural groups or sub-groups, such as vendors and buyers, and possibly to consummate transactions and the like. Selective routing by processing, based for example on area of interest, of video communication controlled by the central unit is fast and effective.

In one disclosed embodiment of the present invention, terminal apparatus, for example personal computers, may exist at a plurality of remote inquiry locations to communicate with a central unit. As a part of the operations, a video display for example (depicting motion and color) may be selectively provided to the terminal apparatus on the basis of an expressed area of interest. Voice recognition operations also may be accommodated. As disclosed in another embodiment, inquiries from wireless terminals with video capability are accommodated.

In accordance with the exemplary embodiments, the central telephonic system includes storage and a central-traffic control system, perhaps independently managed by a third party (or a responder) and possibly located either remote, or separate from, inquiring users and responder facilities. Essentially, the central traffic control system includes one or more processors programmed by data from the storage, which may be variously configured. Basically, one or more processor-readable storage devices are provided, with processor-readable code embodied on such devices, for programming a processing capacity to perform a method of selectively establishing video communication between an inquiring mobile wireless terminal and a select respondent terminal or site. The method involves receiving inquiry data from an active mobile wireless terminal, accessing storage capacity to provide reference respondent data, and determining a select respondent terminal. The select respondent terminal is then activated to provide video image data to the active mobile wireless terminal. Thus the basic method is accomplished. Note that with the storage devices providing audio signals, an active remote terminal may be cued for voice data entry.

The central traffic control system communicates with inquiring users and respondents and provides responder sites accessible to inquiring users. Alternatively the central system may route inquiries and responses to and from select members of plural groups, such as buyers and vendors, with video displays to expedite traditionally complex communications. Specifically, inquiry data may be processed with respect to stored responder data to selectively direct inquiries to appropriate responder sites for the communication of video data, and possibly the consummation of a transaction.

Pursuing the merchandising example for illustration, it is to be understood that communication between the traffic control system and the different buyers and vendors may be accomplished in a variety of ways, as for example, on "check in", by electronic-mail (transmission of messages across a network between two desktop PCs), electronic bulletin boards, Internet communication and on-line computer services (such as Prodigy® or CompuServe®), facsimile, voice-mail or the like or, the communication may include a segment of mobile telecommunications systems (for example cellular). In that regard, vendor data (including data relating to merchandise) may be stored along with buyer data (including identification, e.g. name and electronic address). Also, vendors and buyers may be grouped, as with respect to purchasables. With such data, transactions can be pursued and consummated, based on video communication. Such communication involves video data and includes identification data and transaction data. Any resulting transaction data may be stored for the execution and for billing of transactions.

A video recorder and/or video printer may be located at a remote vendor location, the central traffic control station or a buyer location for selectively or continuously obtaining a video recording or video printout of displays.

Multiple coordinated central traffic control stations may be employed to communicate with widely distributed vendor or buyer locations with capabilities to accommodate various terminal apparatus, including mobile wireless, and to route calls.

A record of the number of calls and related charges incurred by buyers may be maintained, which may be analyzed and ultimately billed. Typically, charges for communication are incurred and may be variously billed. Also, a record of charges incurred depending upon transactions is initiated and may be maintained and billed.

These as well as other features of the present system will become apparent from the detailed description which follows, considered together with the appended drawings.

BRIEF DESCRIPTION OF THE DRAWINGS

A complete understanding of the invention and its advantages may be gained from consideration of the following description of some disclosed embodiments taken in conjunction with the accompanying drawings, in which:

FIG. 8 is an exemplary form indicating a buyer's request; and

FIG. 9 is an exemplary message transmitted from the central traffic station to a buyer or a vendor;

DETAILED DESCRIPTION OF THE PREFERRED EMBODIMENTS

As indicated above, a significant aspect of the present invention is based on recognizing that a dial-up public telephone system may be effectively utilized for visual communication between a plurality of remote locations, regulated, directed and controlled by a central traffic control system. More specifically, it has been recognized that for an effective communication traffic control system, dial-up voice quality lines, such as standard analog or digital lines, as well as wireless facilities may be employed variously in conjunction with videophone equipment, computer facilities (personal computers (PCs) with video capabilities), mobile stations and various forms of telephonic equipment as voice generators, voice recognition units, qualification apparatus, auto dialers and D-channel or in-band signaling apparatus.

Figure 1:
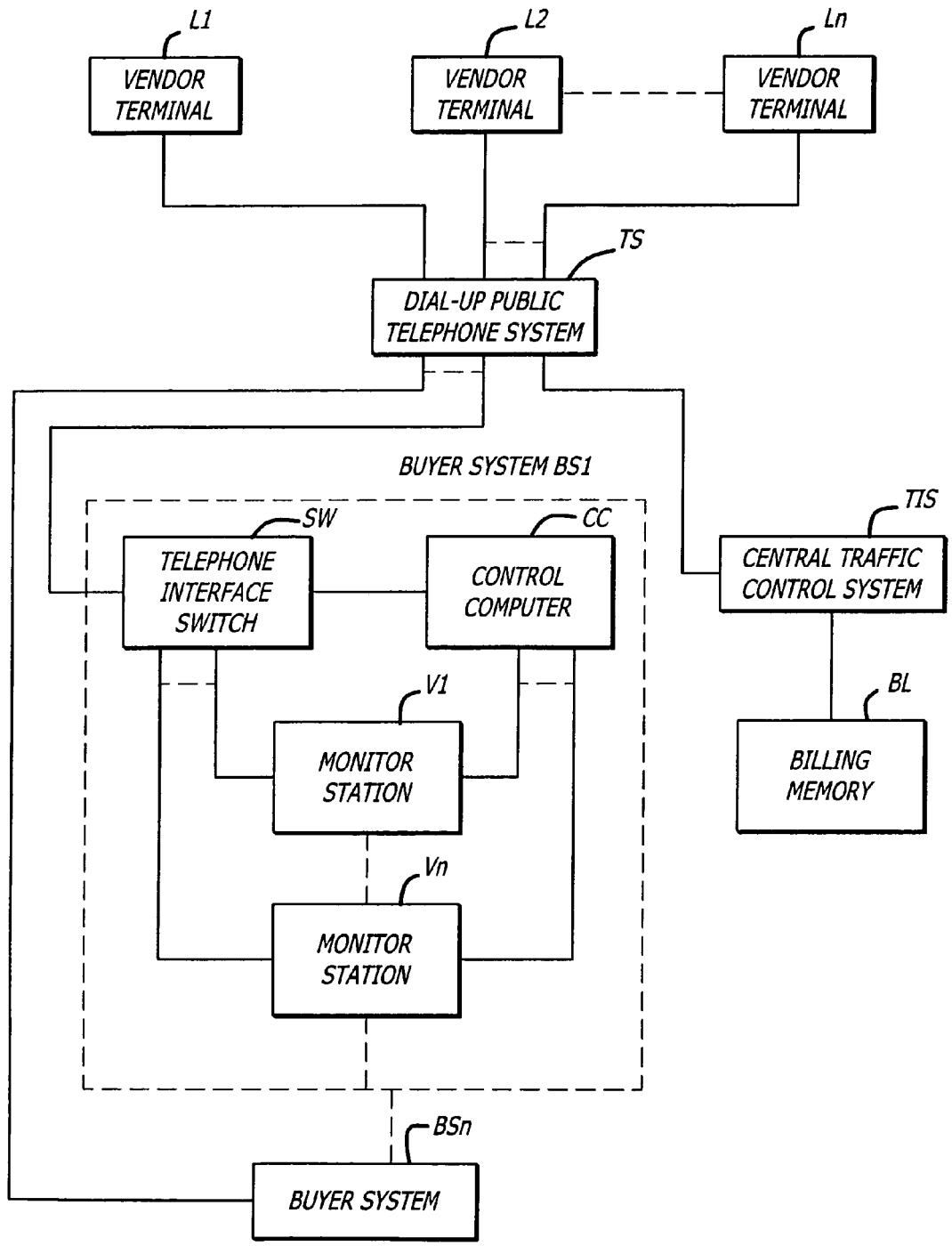
FIG. 1 is a block diagram of a system in accordance with one embodiment, illustrating a telephonic traffic control system; as for merchandising applications.

To that end, a dial-up public telephone system TS is illustrated in FIG. 1 (upper center) affording effective communication between a plurality of remote locations, for example, responder sites, as locations L1-Ln representing vendor sites, and at least one central traffic control system TIS, plus inquiring user terminals, for example buyer systems BS1-BSn. For merchandising applications, the remote vendor location terminals L1-Ln and buyer systems BS1-BSn communicate with the central traffic control system TIS, which may be remotely located from either the buyer or the vendor facilities.

Note that while the terms "merchandising" and "merchandise" are used herein, goods and services are contemplated, that may involve virtually any form of purchasable or saleable, which may be the subject of communication. Also, while merchandising applications typically involve buyers and sellers, in other applications inquiring user terminals and responder sites may involve various persons with various objectives. For example, in a dating service application, the objective may simply be selective communication.

Pursuing the merchandising application for purposes of explanation, the initial embodiment facilitates selective transmission of communications between individual buyers, of plural buyer groups or sub-groups, and members of plural vendor groups or sub-groups. For example, special offerings by vendors for particular merchandise may be transmitted only to buyers designated (by stored identification and transaction data). Likewise, buyer requests for proposals on select merchandise may be transmitted only to vendors designated to sell the merchandise. Accordingly, communication is established and transactions may be consummated with the resulting transaction data stored.

Vendors may communicate with the traffic control station in any of a variety of ways (touch-tone, electronic-mail, voice-mail, wireless, mobile, computer, facsimile or the like) to provide data. Buyers also may communicate with the traffic control system in any of a variety of ways (touch-tone, wireless, mobile telephone, electronic-mail, voice-mail, P.C., facsimile or the like). During visual conferences, vendor's goods may be displayed and described so as to effectively communicate with the buyers.

Either toll free or "800" services at each of the vendor locations may be installed, and "800" number calls, initiated by the buyers, may be billed to each of the vendor locations. Further, the central traffic control system may include a central detail service to arrange telephone services at both the buyer and vendor locations, in order to obtain and report on calls to and from the buyers, as well as, to bill both buyers and vendors for all video telephone communications.

Considerable data may be developed and stored. For example, in addition to storing vendor data (including identification data and subject matter data relating to merchandise), and buyer data (including identification data as name and electronic address), the central traffic control system station may maintain records of calls made by buyers including data, such as the date and time of the call, the name (or designation) of the buyer initiating the call and the duration of the call. Accordingly, information for each buyer may be compiled. Likewise, the central traffic control system may maintain a record of all the calls made to each vendor.

The central traffic control system TIS (FIG. 1, right) may automatically place a call (for example, to broadcast a proposal request from a buyer) to the appropriate vendor locations, determined by a database of vendor locations. Likewise, a buyer's call may be completed to an appropriate vendor location, or vendor site, determined by processing buyer data with stored vendor data. Alternatively, the buyer may actuate an autodialer, such that the autodialer code number (for example, obtained from the central traffic control system database) that ultimately connects him or her to the appropriate vendor. In the event there are complications or otherwise, the buyer may use a regular telephone or a cellular telephone and manually dial a telephone number displayed on the video terminal. Also it is recognized that cellular transmission may provide dynamic motion and high resolutions freeze frame displays.

The illustrated embodiment of FIG. 1 shows an independently managed, central traffic control system TIS, located remote from the buyer systems BS1-BSn and the vendor terminals L1-Ln. Under control of the central traffic control system TIS, communication is provided through the dial-up public telephone system TS, between the vendor sites or terminals L1-Ln and the buyer terminals or systems BS1-BSn. The buyer system BS1 is shown in some detail, specifically, as including a telephone interface switch SW coupled to a control computer CC, coupled to monitor stations V1-Vn. Of course these elements may be variously embodied, for example as disclosed below.

Figure 6:
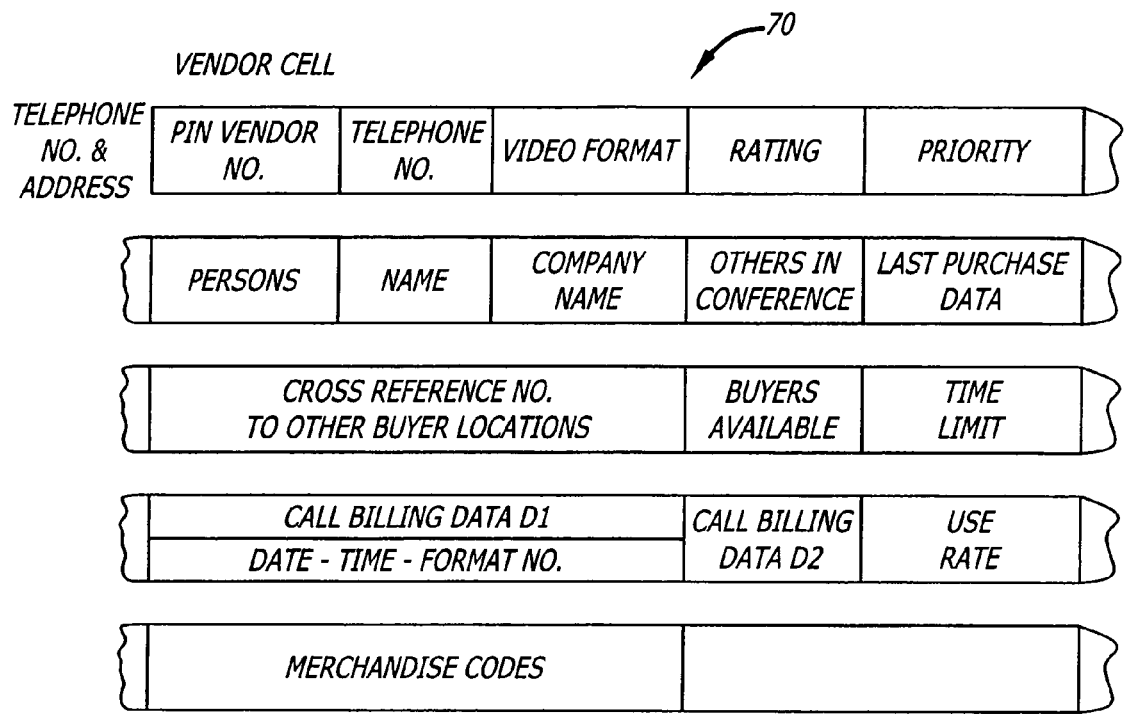
FIG. 6 is a fragmentary diagrammatic representation of an exemplary storage cell for information specific to a vendor, as may be formatted in the system of the present invention.
Figure 7:
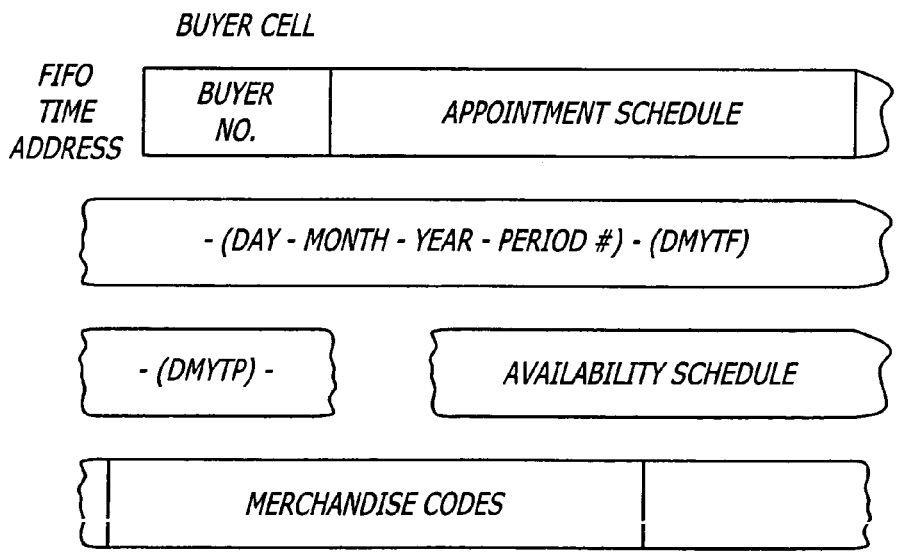
FIG. 7 is a fragmentary diagrammatic representation of an exemplary storage cell for information specific to a buyer, as may be formatted in the system of the present invention.

Preliminarily, consider an exemplary sequence of operations with reference to FIG. 1, assuming that at least certain of the vendor terminals L1-Ln have video capabilities. Alternatively, the vendors may have desktop personal computers incorporating live-action, color video with standard voice telephone lines. Each buyer system BS1-BSn may be equipped to accommodate video communications, e g, band line, mobile wireless, etc. Also, assume for example that vendor and buyer calls are stored in the traffic control system as represented in FIGS. 6 and 7.

Initially, assume that a person at the vendor location L1 wishes to communicate with a buyer at the buyer terminal V1. As a result, telephone equipment at the location L1 is actuated, either manually or automatically, prompting dial-up operations to accomplish a connection from the vendor location L1 through the telephone system TS to the traffic control system TIS. Standard information, for example the specific buyer terminal which the vendor is entitled to reach may be indicated by dialed number identification signals (DNIS) using a capability readily available from the telephone system TS, as for example the so-called D2 channel. It is to be noted that while the D-channel apparatus provides one operational configuration, some DNIS and/or ANI (Automatic Number Identification) data signals can be received in-band without D-channel apparatus. In any event, such signals may direct or qualify communication under control of the central system TIS. It should be noted that DNIS and ANI signals can be used for identification, whereby the buyer control computer CC can fetch identification data for graphic displays.

As another feature, an incoming line can be designated at the central traffic control system TIS, such as an "800" line to receive calls from any telephone (pay-phone, vendor location or the like). For example, a call on the "800" line may be answered by an interface or an operator. The vendor might be specified by ANI signals when calling from a specific vendor location. Accordingly, a vendor can simply call the designated number from any telephone to enter a scheduling program.

As the central traffic control system TIS may interact with a plurality of widely distributed vendors and buyers, a cross reference number identifying transactions with buyers may be important. Moreover, a record of the buyers available along with the time limit for each buyer also is recorded. Similarly, the priority designation or status accorded to a vendor for any of a myriad of reasons may indicate, for example, that a particular vendor has distressed merchandise for sale at discount rates. Also, vendors that are not registered may be able to obtain limited communication with buyers, as for predefined short periods of time, for example, five minutes.

To ensure effective and proper directing and exchanging of traffic, for example, special offers (or invitations for offer) by vendors and responses thereto by buyers, requests for proposals from buyers and responses thereto by vendors, or the like, merchandise classifications, as codes, that apply to each wholesale vendor and wholesale buyer are recorded. The merchandise classifications, discussed in more detail below, are processed to direct communication, as by providing an indication of the type of merchandise that each particular vendor sells.

To recap, under control of the traffic control system TIS, the dial-up public telephone system TS affords effective communication between the vendor locations L1-Ln and buyer systems BS1-BSn. The telephone switch SW, located at a buyer's facility, receives incoming calls and passes outgoing calls that are placed. For composite buyer systems, incoming data signals (DNIS and ANI or MIN) are passed to the internal control computer CC to select an appropriate one of the terminals V1-Vn to handle the call. For example, a station V1 might be assigned to buyer Tom Jones at XYZ Drug company, responsible for purchasing vitamins and over the counter medications. In addition, the buyer computer CC also provides computer graphic signals to monitor station V1 supplementing the coupled television display, for example, to provide a composite display of a scene at location L1 along with appropriate graphic data.

To consider the operation of a total-system embodiment in somewhat greater detail, reference will now be made to FIG. 2 in which previously identified components bear similar reference numbers. Preliminarily, it should be recognized that certain basic components illustrated at the central traffic control site TIS (right) such as memory, data storage, auto dialers, printers, VCRs etc., may also be found at the buyer or vendor units. Essentially, the central traffic control system TIS directs and exchanges on-line and off-line communication between the vendor and buyer units.

The central traffic control system TIS (right) may initiate contact with the vendor location terminals L1-Ln or the buyer terminals V1-Vn (in predetermined sequence by codes or randomly) to afford communication with a designated vendor or buyer. For visual conferences, buyers may initiate contact with the traffic control system TIS, for communication with an appropriate one of the vendor terminals L1-Ln.

Different vendor locations may have different communication capabilities, as represented by terminals VP1/VS1 for analog telephone communication capabilities over standard analog lines (static, videophone or PC), terminal VD1 for digital video capabilities over ISDN lines, and CDP1 for a combined terminal for analog and digital communication capabilities. For illustration purposes, FIG. 2 shows one telephone terminal (see CDP1) as exhibiting both analog and digital communication capabilities.

The videophone terminal VP1 may be a unit available from AT&T, such as the Videophone 2500, or one available from MCI. A form of the digital video system VD1, for example, the NCR PVS-70 system also is available from AT&T/NCR and is recognized to provide high quality images. A static video system VS1 may be AT&T's PICASSO™ still image phone, which transmits "picture perfect" still color images and voice simultaneously in just a matter of seconds. By pushing a button on the PICASSO™ phone, a still image (for a camcorder or electronic camera) may be captured and, by pushing another button, that picture may be transmitted to another PICASSO™ phone. Such a video static system connects to standard analog telephone lines and is compatible with a wide range of video technology used in daily communication and industry standard camcorders, electronic cameras, mouse devices, document scanners and photo CD players. Accordingly, full-color images, virtually of any type, size or dimension may be transmitted for display on a TV, LCD panel, PC monitor or video monitor. Images may be stored or printed using a PC interface.

Figure 2:
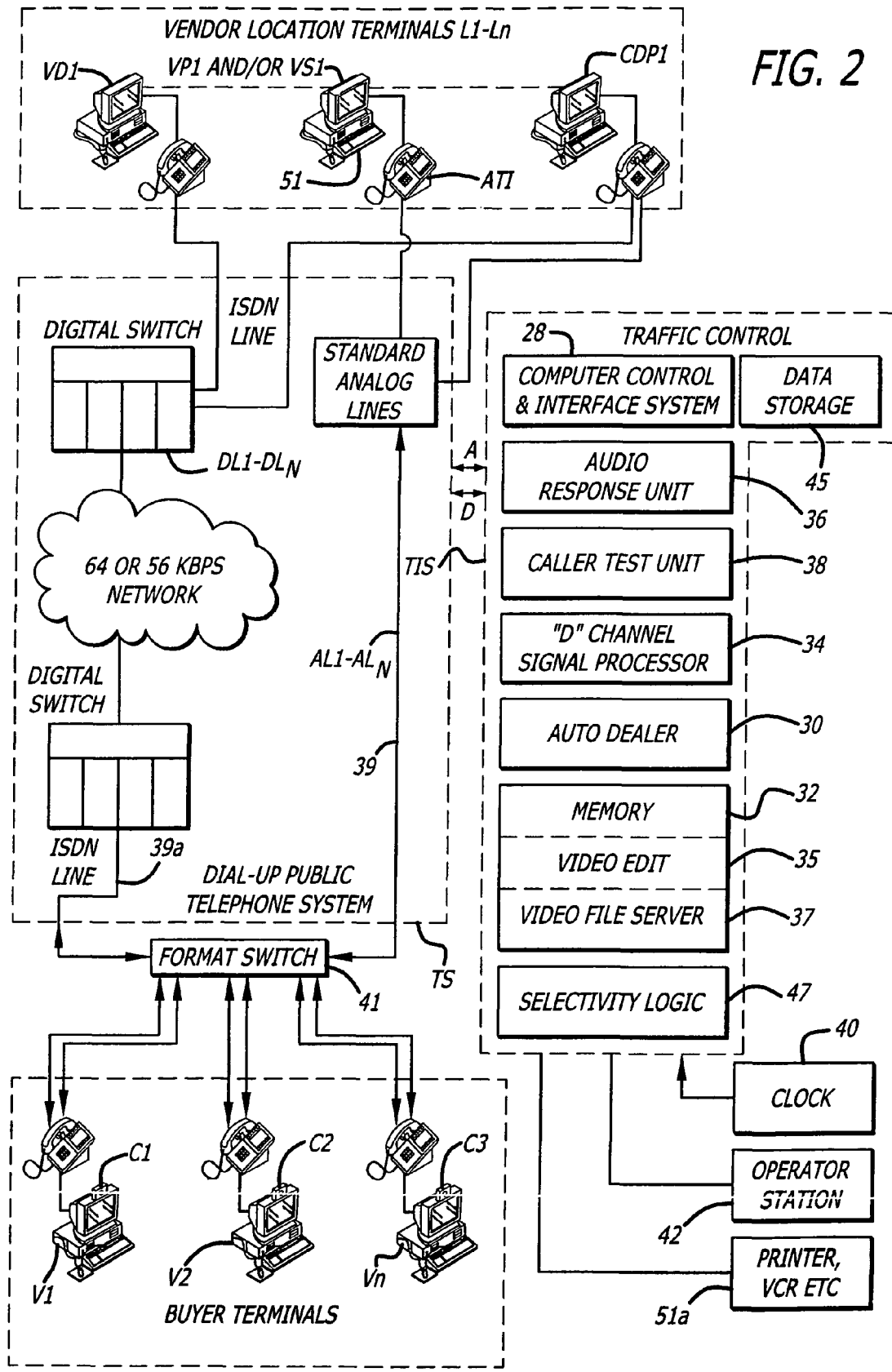
FIG. 2 is a more detailed block and pictorial diagram of the system as generally depicted in FIG. 1, illustrating components of the system.

Recognizing that various communication facilities may be involved, FIG. 2 illustrates representative buyer terminals V1-Vn, coupled to the traffic control system TIS. Of course, all the buyer terminals, as well as, the central traffic control system may be compatibly configured. Note that different videophone systems rely on their own proprietary codecs, sometimes with more than one as an option. Generally, the buyer terminals V1-Vn have the capability to accommodate videophone operation along with telephone switching and a variety of control functions. Mobile wireless video techniques also may be employed.

The central traffic control system TIS includes a platform, basically in the form of a computer control and interface system 28 as described in greater detail below. Generally the system 28 may incorporate a telephone platform (or OAI, as well known) to operate in accordance with the functions as described below. The system 28 may incorporate wireless mobile facilities and is coupled to several operating devices including an auto dialer 30, a memory 32, a "D" channel signal processor 34, an audio response unit (ARU) 36 and a caller test unit 38. These structures and their interconnections are disclosed in greater detail below.

The computer traffic control system TIS also is connected to a clock 40 and an operator station 42. The clock 40 may control scheduling operations as explained above. For example, updates or changes to appointments, such as cancellations, may be remotely implemented (for example, via the central traffic control system TIS) and forwarded to the appropriate buyer in a variety of ways, such as facsimile, electronic-mail, voice-mail or the like. The clock 40 may likewise monitor time limitations, as when special offerings and proposals are only valid for defined intervals of time.

Using a live operator station, e.g. the station 42, calls from vendors seeking appointments, making special offerings, or alternatively, calls from buyers may be transferred to a human operator, in the event there are complications with the automatic response units or message recording equipment or in the event callers are calling from a rotary telephone. Some vendors or buyers may prefer telephone communication with a human operator at some level.

As indicated above, flexibility to accommodate various vendor and buyer equipment configurations is an important aspect of the central traffic control system TIS. In that regard, it should be recognized that even though only the buyer operator terminals V1-Vn are shown coupled to a format switch 41 (lower center), the central traffic control system TIS also has some form of a format switch, shown as part of the video file server 37. The format switch 41 selects a compatible one of analog video circuits and static video circuits (on analog communication lines) and digital video circuits (on digital communication lines) for driving one or more monitors incorporating such specific circuits.

At the buyer terminals, each of the video monitors V1-Vn carries a camera C1-Cn which may variously facilitate dynamic motion images and still images. The format switch unit 41 can switch a single analog line 39 (from analog lines AL1-ALn) to couple either videophone circuits or static video circuits, or a digital line (or lines from digital lines DL1-DLn) indicated at 39*a* to couple digital video circuits. Note that two lines are typically required for digital video, one for audio and one for digital data. Alternatively, the audio line may also serve as the analog line.

Coupled to the traffic control system TIS, a video recorder (VCR) also may be provided, (FIG. 2, lower right) indicated at 51*a*, which may be set to record continuously or intermittently, to provide historical data for subsequent reference when conferring with a supervisor or refreshing the memory with respect to specific features. A video printer, also indicated at 51*a*, may be used. On receiving a request command, for example from the traffic control system TIS. The video recorder may record compressed video signals of the display images. Of course, continuous recording by the video recorder may be suspended when desired.

At locations where more than one camera is positioned, a single video recorder may be connected to the multiple cameras via a switching device to control and sequence the recordings from the cameras. A switching device such as the intelligent sequential switcher manufactured by SONY, as Model No. YS-S100, may be used to control and sequence multiple recordings. In addition, plural video recorders, such as separate video recorders for recording images transmitted on digital or analog lines may be connected.

In some situations, select frozen frames of viewings, as of vendor products, or a specific time period of each viewing of a vendor product may be recorded on a VCR or printed using a video printer. Such video prints may be obtained both by buyers and vendors.

The traffic control system TIS also includes within the memory 32, or separate therefrom, a video EDI 35 for storing EDI software (Electronic Data Interchange, facilitating direct computer-to-computer exchange of forms) or the like. It should be recognized that the buyer terminals V1-Vn may also have EDI software or the like stored in memory, by virtue of which, easy access to and exchange of forms is facilitated.

The traffic control system TIS also includes a video file server 37 embodied in the memory 32, where vendors and buyers may deposit a video recording of a product being offered by a vendor or alternatively, desired by a buyer.

A block indicated at 45 and labeled "data storage" stores system and network software. Selectivity logic, indicated at 47 selectively directs communications between members of plural groups or sub-groups, such as buyer and vendor groups. Operations relating to the selectivity logic 47 are discussed below.

Whether a conference is implemented as a result of a call from a vendor, from a buyer, or as a result of a scheduled appointment, in accordance with the present development, the active terminal V1-Vn (buyer terminal) is formatted to a configuration compatible with the connected vendor terminal. In that regard, the terminal ATI (vendor) simply accommodates audio and digital signals and is representative of such terminals for use to schedule appointments, as in an ARU interface. Alternatively, person-to-person communication is available through the operator station 42.

The videophone terminal VP 1 is representative of such units to provide one form of audio/video communication with one of the buyer terminals V1-Vn. During such communication, the format switch 41 is actuated to activate the videophone circuits to function in cooperation with one of the buyer terminal monitors V1-Vn. Thus, compatible communication is implemented for each outgoing call, utilizing data from the memory 32.

For communication with static video systems (PIC-ASSO™ units) as represented by the terminal VS 1, the switch 41 actuates the static video circuits for compatible operation of a monitor V1 or Vn. Note that particularly effective operations may involve combination formats, for example, a videophone and a static video system (likely using a single analog line). Specifically, with both of the appropriate circuits operative, the camera C1 and the monitor V1 may function in a videophone format to accommodate effective personal communication between a buyer and a vendor. Concurrently, the camera and the monitor V1 may operate in a static video format to effectively exhibit a vendor's product. Additionally, a mouse 51 at the terminal VS1, controls a cursor in the display of the monitor V1 further enhancing interactive communication. A mouse, such as the one indicated at 51 may also be provided at the buyer terminals V1-Vn. Again, the switch 41 controls the operations to attain the compatible format.

To further illustrate the possibilities, the terminal VD1 is representative of high fidelity (hi-fi) telephonic video systems using digital lines for higher resolution dynamic displays. As with respect to the other formats, the switch 41 selectively actuates the compatible circuits, the digital video circuits, to drive a selected combination of camera and monitor. It may be seen that the video platforms of terminals offer considerable flexibility in accommodating multiple audio-video formats.

Figure 3:
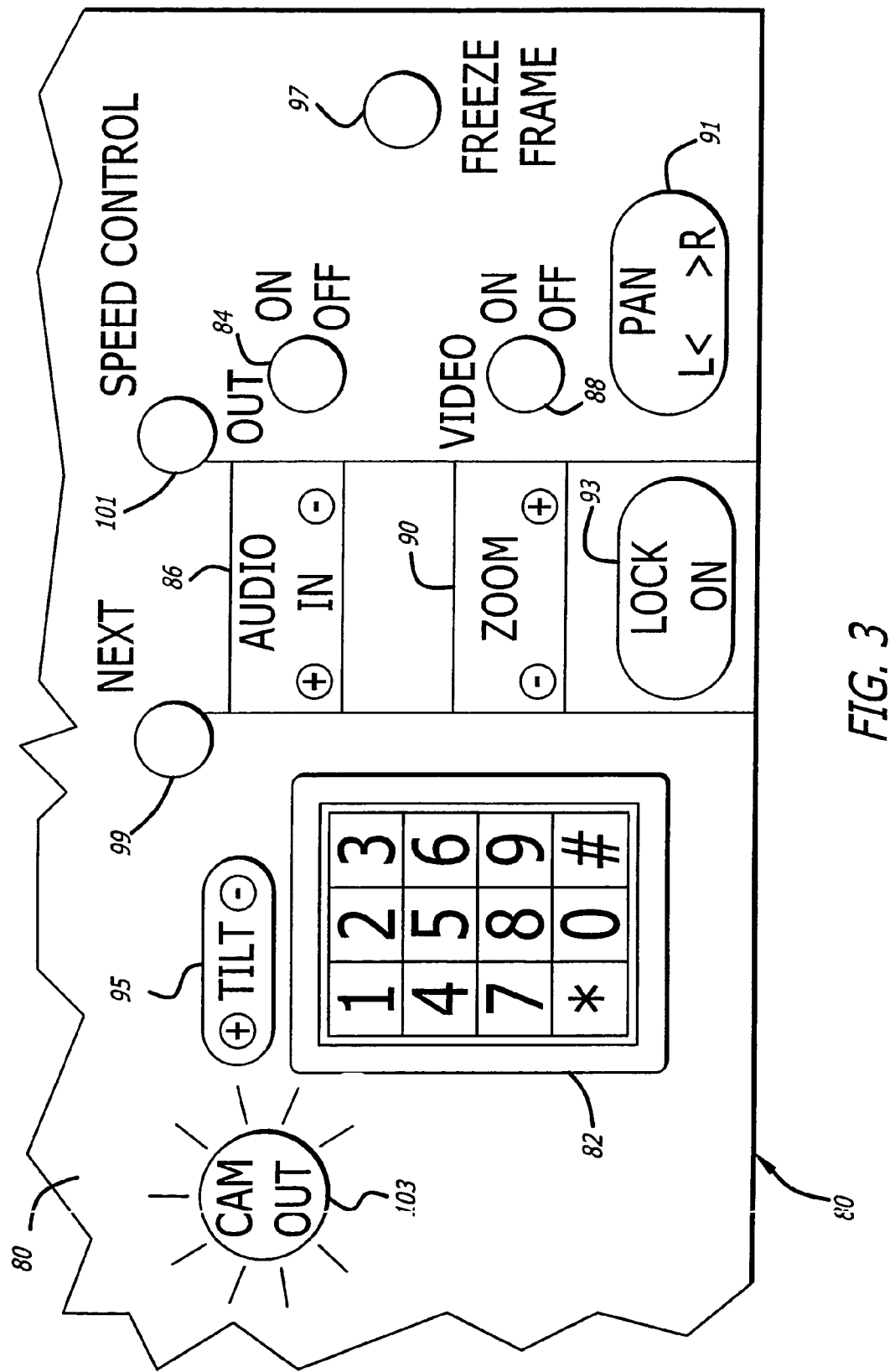
FIG. 3 is a graphic representation of a portion of the control panel of an element in the system of FIG. 2.

Recapitulating, the buyer terminal V1 has been described for communication with the various equipments at locations to include a video location for display. In addition to the display, each of the terminals V1-Vn incorporates a handpiece or equivalent, and a substantial control panel that may be in the form of a telephone pad or embodied as part of a personal computer keyboard. In any event, the control panel for each terminal V1-Vn includes the current controls for an operative video format, plus dedicated controls relating to the disclosed system. In that regard, in the interest of avoiding undue complications, only a fragment of the representative panel 80 for the terminal V1 is shown in FIG. 3.

Generally the panel 80 affords considerable control, including the use of keypad tone signals (DTMF) to perform control operations at both ends of a communication. Specifically, the illustrated fragment of the panel 80 of FIG. 3 incorporates a traditional twelve-button telephone pad 82, bearing the numerals "1" through "0" along with the symbols "*" and "#." The designated buttons each generate a distinct DTMF signal in accordance with extensive practice, which signals are communicated to connected terminals.

Various other specific controls are provided on the panel 80. An on-off button 84 controls outgoing audio. A toggle 86 controls the volume of incoming audio. An on-off switch 88 controls video at the terminal. A pair of toggle switches 90 and 91, respectively, control zooming and panning camera operations. A push button switch 93 serves as an interrupt for locking onto the current display (high quality freeze frame) for closer observation or to record data and in some cases higher resolution images for closer observation at a later time, for example, by use of a video printer. In addition, another toggle switch 95 controls tilting camera operations and a push button 97 advances the freeze frame for subsequent observation or reverses it back to a dynamic display. A push button switch 99 serves to manually terminate the call. A control switch 101 regulates resolution of the display. Finally a signal lamp 103 illuminates to indicate the next appointment.

Generally, by using the telephone keypad 82 on the panel 80, various control functions can be accomplished as detailed in the parent patent applications identified herein under the caption "CROSS REFERENCE TO RELATED APPLICATIONS" and incorporated herein by reference.

One form of control involves video coordination. For example, in accordance with a program, a conference might be initiated in a videophone format with the terminal V1 (FIG. 2). Accordingly, the videophone circuits are active to drive the video monitor V1. At some point, assume the conference participants decide to add a static video communication. A command of "52" in touch tones on the pad 82 (see FIG. 3) initiates a series of operations. Specifically, another line connection is established by actuating the autodialer 30 (FIG. 2), then static video circuits are actuated. At the terminal V1, the static video circuits are actuated to drive the monitor V1 that may involve another monitor or split image operation. Separate displays for dynamic and still video may be used, such that a buyer at one monitor can confer with a vendor, speaking face-to-face through the camera and that monitor, while the vendor exhibits fine details of a product on a second monitor in a still image. Of course, in sequences of such still images, views can be changed and areas highlighted with a cursor controlled by the mouse 51.

As an alternative to actuating the static video format, the conferees may elect to go digital. A command "53" from the panel 80 sets the requisite steps in motion. The autodialer 30 dials up a digital connection, then using that connection, the switch 41 actuates the digital video circuits to drive one of the monitors V1-Vn. Note that with enhanced hi-fi video communication, the assumed videophone communication might best be terminated.

In view of these examples, it will be apparent that the operator at the terminal V1 has substantial control, including the ability to go from one video format to another. Of course, such operations presume that the vendor has the requisite capacity, which may be indicated in the graphic display as treated in greater detail below.

From the above descriptions, it is apparent that the disclosed system utilizes videophone technology in combination with other telephone system technology along with computer control and graphics technology to accomplish effective scheduling and processing of traffic for selective visual communication, which may culminate in a transaction.

Inbound calls for vendor or buyer, may be received through the interface system 28 (FIG. 2, right). The format switch 41 may incorporate a variable codec for analog lines AL1-ALN and digital lines DL1-DLN. For analog lines, a video CODEC along with computing capability may take the form of an AVP 1000 video CODEC chip set as available from AT&T. Essentially, the CODEC chip set accomplishes videophone operation and consists of a video encoder, a video decoder and an internal system controller. The format switch unit 41 is shown to be coupled between a standard analog line and a line on ISDN. Upon receiving a call from a videophone unit, the format switch unit 41 selects the appropriate line, that is, the analog line. Alternatively, upon receiving a call from a high fidelity video (digital) the format switch unit 41 selects a digital line. Also, as described above, during visual communication (real-time) a buyer may alter switches, e.g., from transmitting dynamic images over a single analog line to high resolution freeze frames. The high resolution freeze frames may be viewed on large 14 inch monitors. Further, the images may be manipulated from either end, to view the freeze frame image concurrently.

In the operation of the system embracing the exemplary formats as treated above and below, a record is made for billing purposes. That is, a billing memory unit BL (FIG. 1) and a standard printer (block 51*a*) are controlled by the computer control 28, (FIG. 2) recording all transactions in relation to billing charges. Such data can be variously processed at different times. Basically, the concept involves formulating billing data, so that at least a part of the calls made to a vendor, for example, can be rebilled to that vendor.

Considering the functions of the dial-up telephone system TS (FIG. 2) in somewhat greater detail, an inter-exchange carrier (e.g., AT&T) provides comprehensive data on calls specifying: phone number calling, phone number called, date, time, length of call (period), billing data and so on. Test or look-up operations are then performed with reference to a vendor database. Accordingly, portions of the charges (with or without mark-ups) are rebilled (with appropriate identification to the vendors). Such operations may be particularly effective in relation to "private" networks, e.g., the so-called SDN (software defined network), SDDN (software defined data network) which are compatible with ISDN operations, or a combination of the two service offerings (SDN with SDDN). Note that AT&T's SDN is a virtual network service which offers an organization the ability to build a private corporate network within the AT&T public network. A customized database contains information on various sites affiliated with the organization (i.e., the service organization installs a "private" network service at many different business entities) as well as features and routing information. Moreover, SDN encompasses voice, analog data, digital data and image transfer. SDDN is a feature of SDN and is most often installed in conjunction with SDN. A combination of the two provides the capability of combining all the different sites for network management and billing. Note that both buyers and vendors may wish to extend the scope of the network of participants by installing at least one similar mode of video in their branches, plants and/or for customers.

Essentially, coordinated with the control computer 28 in the system TIS, reapportioning and rebilling options are executed by the billing data unit utilizing storage capacity of the memory 32 or a separate billing data memory.

Different vendors and buyers may be registered with the central traffic control system TIS. Accordingly, the traffic control system TIS may assign an identification number and, for example, store the following information under that identification number in memory: Jones, Roger, XYZ Toy Company, Analog System, Telephone number (212) 555-5555, Registered to interact with EFG Company (central station number—(310) 666-6666), no priority, IJK Company (central station number—(414) 777-7777), priority with buyer no. 3.

At registration, each vendor and buyer fills out a subscription form or otherwise provides the central traffic control system with specific information, such as the nature of the merchandise they are designated to sell or buy. This information may be provided with reference to an established list of merchandise codes. The designated merchandise codes assist the selectivity logic 47 (FIG. 2) in making routing determinations according to expressed areas of interest.

It should be recognized that video recordings on specific merchandise may be stored at the video file server 37 for viewing by buyers, and transactions may be consummated without any direct visual conferences between vendors and buyers.

Figure 4:
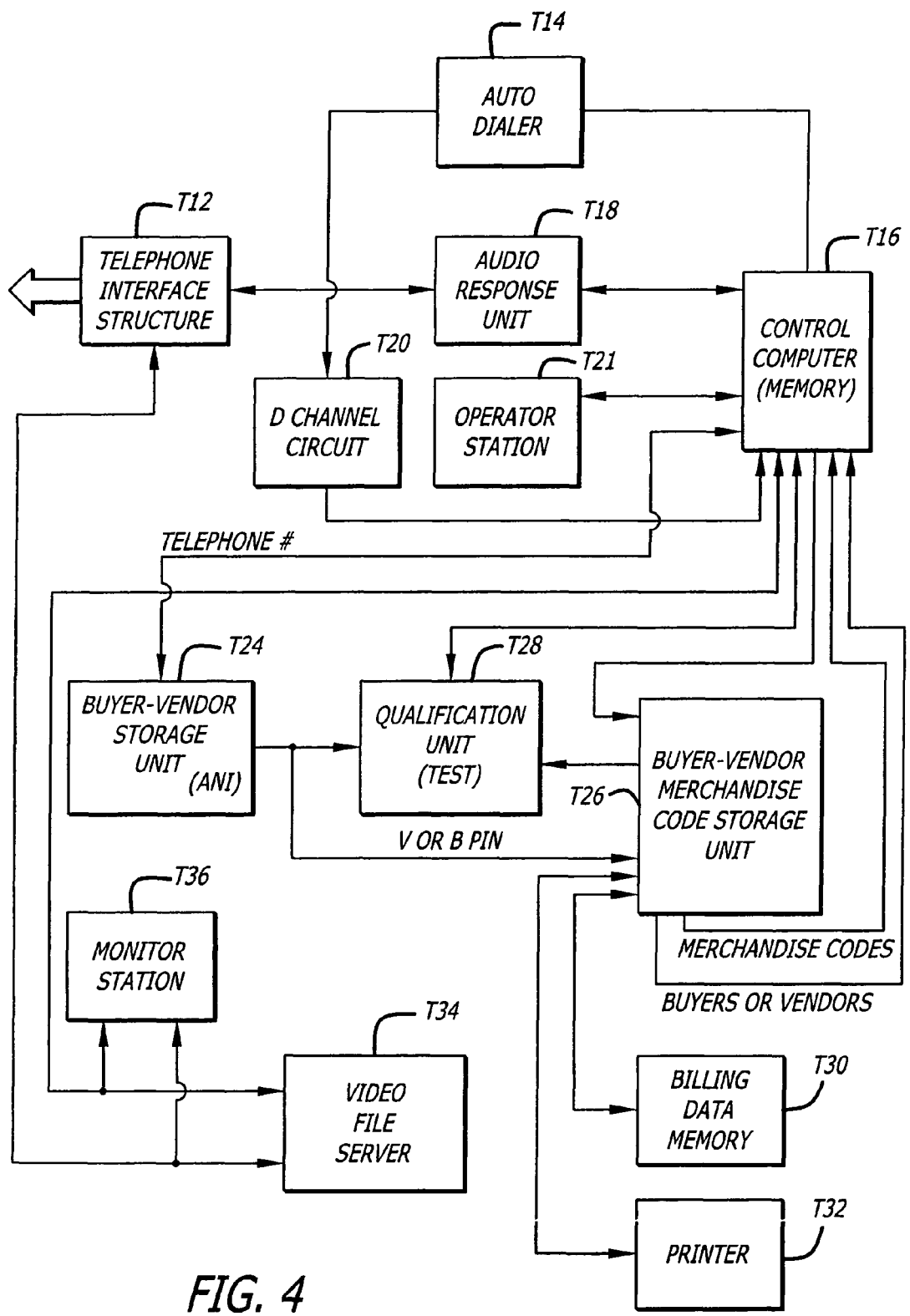
FIG. 4 is a more detailed block diagram illustrating the central traffic control system of the scheduling and routing system of FIG. 2.

As indicated above, the traffic control system TIS incorporates structure for a wide variety of communications through the dial-up telephone system TS. FIG. 4 illustrates a more specific exemplary form of the system TIS. A telephone platform or interface T12 (upper left) accommodates a multitude of line connections to the dial-up public telephone system TS (FIGS. 1 and 2) accommodating two-way communication with various capabilities as treated above. For example, the interface structure T12 (FIG. 4) accommodates the placement of outgoing calls by an auto dialer T14 controlled by a computer T16 incorporating substantial memory. Auto dialers are well known in the telephone arts functioning to place calls in response to digital instructions. As the source of such digital instructions, along with others, the control computer T16 comprises a substantial computing capability, functioning to control telephonic traffic in various communication forms through the telephone interface structure T12. Traffic is controlled, both for servicing and interconnecting remote terminals at both vendor and buyer locations, e.g., buyer locations BS1-BSn (FIG. 1) and vendor terminals, e.g. terminals L1-Ln.

The control computer T16 (FIG. 4) also is connected to an audio response unit T18 for vocally cuing and otherwise interfacing remote stations through the telephone interface structure T12. Again, various forms of audio response units are well known in the telephonic arts for verbalizing cues, receiving digital signals and performing some processing. In that regard, the audio response unit T18 may incorporate some dictionary capability or may rely on the control computer T16 for an extended dictionary of words to be vocalized.

The control computer T16 also is connected to receive signals from the telephone interface structure T12 through a "D" channel circuit T20. For example, the "D" channel circuit receives ANI and DNIS signals indicative of calling and called station numbers as explained above. Essentially, the "D" channel circuit T20 provides call related information to the control computer T16 in accordance with well-known techniques of the telephonic arts.

Recapitulating to some extent, it may be seen that the control computer T16, along with the above-mentioned structures, has substantial capability to interface remote terminals. However, under certain conditions, manual communication also may be desired. Accordingly, as explained above, an operator station T21 is coupled to the computer T16 to accommodate a human interface. The operator station T21 may take the form of a CRT terminal with graphics display capability and various controls (FIG. 3) implemented through the control computer T16.

As indicated above, to accomplish the traffic control function, the computer T16 has substantial computing capability, specifically, for purposes of control, storage management, delivery, scheduling and interconnecting remote stations. For convenience of explanation, in FIG. 4, several operating components that could be integrated in the computer T16 are separately illustrated. Such separate illustration also facilitates the operating explanations. Specifically, separate storage capacity is illustrated in the form of a buyer-vendor storage unit T24 and a buyer-vendor/merchandise code storage unit T26. The storage units T24 and T26 are addressed by the control computer T16 to provide data that is processed along with other data to control and facilitate on-line and off-line communications between buyer and vendor terminals pursuant to a possible transaction.

As suggested above, communication between the various vendors and buyers involves substantial control, direction and regulation along with limitations, thus, the term "traffic control" is deemed appropriate. In that regard, a qualification unit T28 is coupled both to the control computer T16 and the storage units T24 and T26. Essentially, the qualification unit T28 receives identification, type of subject matter and limitation data to qualify buyers or vendors for select individual communications. The storage unit T26 is coupled directly to the computer T16, along with a billing data memory T30 and a printer T32 for operation as mentioned above.

Summarizing the extensive treatment above, the present system variously implements both online and offline communication as between vendors and buyers. The communication is considerably enhanced by terminal section and video displays. Accordingly, a video file server T34 is coupled directly to the telephone interface structure T12 and to the control computer T16. A monitor station T36 is similarly coupled, as for select time or call monitoring.

In view of the preliminary description of the control structure (FIG. 4) a comprehensive explanation of the system now may be expressed by assuming particular situations and describing typical operating sequences. Accordingly, assume the structure of FIG. 4 is coupled as the traffic control system TIS in the system of FIG. 2 for controlling and regulating select communications between vendor and buyer terminals. In that regard, as an exemplary application, a system of merchandise classification may be used for selectivity of communication. Generally, as an example, merchandise may be classified numerically in accordance with a decimal system, somewhat equated to channels of commerce for various goods. For example, a component of such a classification is as follows.

CHART A

| Merchandise | Decimal Code |
| --- | --- |
| Body Treatment | 470000 |
| Skin | 471000 |
| Sun Cream | 47260 |
| Prevent & Protect | 471230 |
| Water Resist | 471234 |
| Tanning | 471235 |
| Cream | 471300 |
| Moisture | 471310 |
| Cleansing | 471320 |
| Hair | 472000 |

In accordance with the exemplary classification, "body-treatment" merchandise carries the code "470000". More explicit classifications of such merchandise carry additional decimal indicators. For example, as indicated above, water-resistant, sun protection treatment would be identified by the merchandise code "471234". Accordingly, entire ranges of merchandise may be classified and coded to control and regulate communication traffic in accordance herewith.

Generally, in the disclosed embodiment, preliminary inquiries, offers for sale, and requests for proposals all carry merchandise codes for processing to selectively identify potentially interested vendors or buyers. As a further element of classification, buyers or vendors also may be assigned specific codes, for example, designating businesses as primarily as, supermarkets, department stores, drug stores and so on.

As detailed below, the operation of the system will be treated as it regulates and controls video communication, (direct or indirect) for example, selectively between vendors and buyers, to expedite traditionally complex purchasing operations. In that regard, the embodiment treats six types of telephone calls. Specifically, primary calls are classified in accordance with the following chart.

CHART B

| Type Call | Nature |
|---|---|
| "A" | Vendor with special offering |
| "B" | Buyer responding to special offering |
| "C" | Buyer with Request for Proposal (RFP) |
| "D" | Vendor responding to RFP |
| "E" | Vendor seeking appointment |
| "F" | Buyer seeking appointment |

As indicated, calls of various types may involve some form of qualification or approval. For example, access to the system may be limited to qualified or registered entities. Also, certain limitations may be imposed on such entities. Of course, specific forms of limitations and qualifications may be implemented depending upon specific applications. Qualifications are generally performed by the qualification unit T28 (FIG. 4) utilizing information derived from a call correlated with reference data from the storage units T24 and T26. In that regard, the logic for the qualification unit T28 may be implemented in accordance with the flow diagram of FIG. 5 as will now be considered.

In the disclosed embodiment, exemplary qualifications for buyers and vendors are somewhat similar. Specifically, the tests for a calling vendor may be:

Is the calling station registered as a vendor (or buyer)?
Can the caller give a proper PIN number (Identification Number)?
Is the vendor qualified for the designated merchandise?
Is the vendor approved for an identified buyer or buyers?

Figure 5:
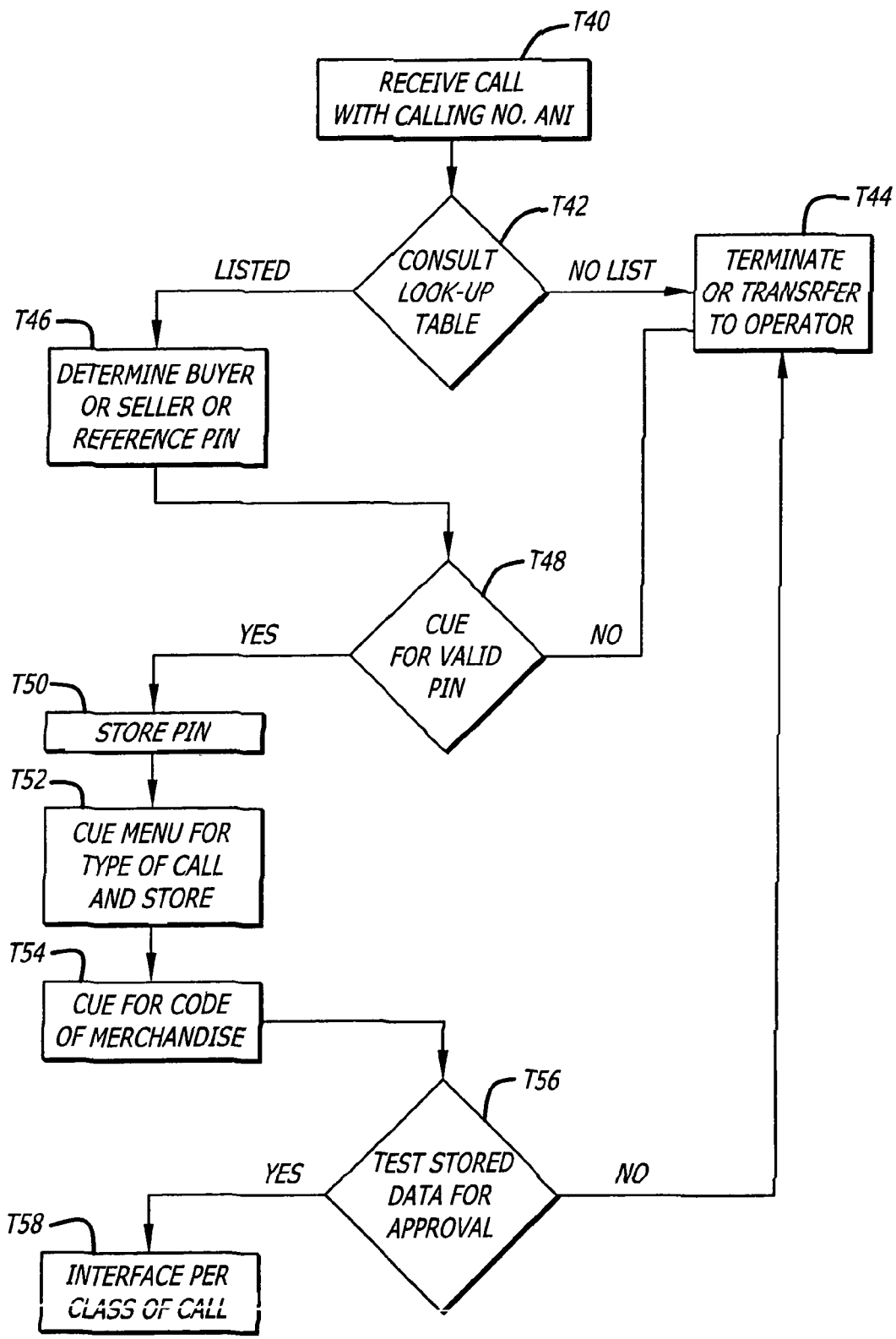
FIG. 5 is a logic flow diagram illustrating an exemplary operation format of the system of FIG. 4 for automated qualification of callers, such as vendors or buyers.

The tests for calling a buyer may be quite similar. To consider the logic embodied in the qualification unit T28 (FIG. 4), reference will now be made somewhat concurrently to FIGS. 4 and 5. With the occurrence of an incoming call through the telephone interface structure T12 (FIG. 4), "D" channel signals are supplied through the circuit T20 to the control computer T16. As a result, the computer T16 addresses the buyer-vendor storage unit T24, using the call number of the originating terminal (ANI). Of course, in other applications DNIS signals may be similarly employed. The operation is illustrated by a block T40 (FIG. 5). Addressed by the calling number, the storage unit T24 (FIG. 4) supplies representative signals indicating: first, that the calling terminal does belong to a registered buyer or seller, whether the entity is a buyer or a seller, and the identification number (PIN) for the entity. The operation of consulting the storage unit T24 or an embodied look-up table is illustrated by a query block T42 in FIG. 5.

If the calling terminal number is not located, indicating an unregistered caller, the qualification unit T28 (FIG. 4) actuates the computer T16 for appropriate control. Specifically, the audio response unit T18 may be prompted to provide a termination message or the operator station T21 may be actuated for a human interface. Such alternatives are represented in FIG. 5 by the block T44.

For calls originating from a registered terminal, the qualification unit T28 (FIG. 4) stores the pertinent data, i.e., buyer or seller I.D. and reference PIN. The operation is illustrated in FIG. 5 by the block T46.

With the determination of a properly registered calling terminal, the computer T16 actuates the audio response unit T18 providing a verbal cue for an identification number (PIN). The operation is illustrated in FIG. 5 by the query block T48. If the caller enters keypad digital information indicating an invalid PIN, or makes no entry at all, the operation again proceeds to the block T44 for termination or transfer of the call as explained above. With the entry of a valid PIN, the operation proceeds to store the personal identification number as indicated by a block T50.

The qualification unit T28 (FIG. 4) next functions in cooperation with the computer T16 driving the audio response unit T18 to cue the caller for the type of call and the merchandise code, see blocks T52 and T54 (FIG. 5) representing such operations. Although such operations are not detailed in FIG. 5, it is to be understood that improper responses or the lack of a response will transfer the process to the function of block T44, as illustrated, to terminate or transfer the call. On the contrary, if appropriate information is received, the qualification unit T28 (FIG. 4) receives and stores the requested information. Consequently, the unit T28 contains: the caller's PIN number, the call type and the merchandise code. That data is then tested within the qualification unit T28, against reference data, in a process step as illustrated by the query block T56 in FIG. 5. The details of the test are treated in somewhat greater detail below; however, as illustrated in FIG. 5, if the tests are not successful, the process again proceeds to the termination block T44; otherwise, the process proceeds to a block T58 to implement the substantive communication of the call.

The final test of the call involves operation of the qualification unit T28 (FIG. 4) in conjunction with the storage unit T26. That is, for each buyer and vendor, the unit T26 stores merchandise codes and, in some instances, other special information.

In operation, typically, vendors may be denied access to certain information. For example, a vendor would not have access to the type calls: "A" (a special offering of another vendor), "D" (another vendor responding to an RFP) and so on. However, exceptions are possible and in that regard it is simply important to appreciate that special situations may be stored in the unit T26.

Returning to the routine situation, as indicated above, each buyer and vendor is associated with stored merchandise data. In that regard, merchandise codes not only facilitate and expedite selective communication but additionally, charges and billing data (for storage in the memory T30) may be based on active merchandise codes for a subscriber.

Pursuing a specific example, assume a caller, identified as a vendor and otherwise qualified is pursuing the presentation of a special offering. Further assume that the calling vendor is associated only with hair products (Chart A, code 472000). However, assume that the caller identifies the "merchandise of interest" to be a water resistant sun skin product, code 471234. Thus, the identified merchandise code does not coincide with the caller's registered merchandise code. In such a case, the processing is halted with the consequence that the call is either terminated or transferred to an operator. At this stage, likely operation would involve referring the call to an operator. Thus, the qualification unit T28 concludes the test by assuring that the entity being represented by a call is authorized for access with respect to the identified codes.

Pursuing the example of a vendor with a special offering, i.e., call type "A". The caller may represent a vendor entity dealing in distressed merchandise holding a considerable volume of hair shampoo packaged for women, i.e., merchandise code "472147". With the merchandise codes stored, the control computer T16 actuates the video file server T34 along with the audio response unit T18 to receive from storage a video presentation of the merchandise, that is, the hair shampoo. Typically, the vendor will have organized the presentation prior to making the telephone call so that the merchandise can be variously demonstrated and various information provided, including pricing etc. Thus, an effective record of the video presentation is stored in the file server T34 essentially in the form of a sales presentation for the hair shampoo, that is, product code "472147". Note that the video presentation also may be stored at the vendor's facility for access.

With the completion of the video record, the control computer T16 actuates the storage unit T26 to isolate all buyers associated with the product code "472147" identifying hair shampoo. With the list of buyers identified and a video presentation recorded, the subsequent operations involve communicating the video presentation to the select group of buyers. In accordance with the disclosed embodiment, the identified buyer group is notified of the availability of the demonstration. Alternatively, buyers may be informed of the merchandise by different techniques, including inquiry probes.

Informed of the vendor data, in the form of a data relating to merchandise, qualified buyers may establish communication (call "B") through the telephone interface structure T12 (FIG. 4) to receive the stored video presentation from the file server T34. Various specific arrangements may be involved. For example, the central traffic system (FIGS. 1 and 2) may maintain a record or log of all the buyers accessing the video file server, which may be provided to the vendor, upon request. A record of the time (provided by the clock) spent by each buyer in viewing a video presentation may also be maintained.

A specific buyer may terminate the video after viewing it for only a few minutes, while another buyer may view the entire video presentation. The vendor may request such information to determine buyers' reactions to the special offering, for marketing or other reasons.

In some situations, it may be particularly advantageous for buyers to receive early notice of a special offering by a vendor. Accordingly, it may be desirable to implement a rotational order scheme or a random operation for determining the sequence in notifying buyers. Specifically, a random number generator may be incorporated in the control computer T16 for ordering the list of buyers for notification.

Notices to buyers or vendors also may vary considerably, depending upon individual programming considerations. In some situations, vendors may provide a special list of buyers or alternatively, exclude specific buyers. All buyers and vendors are provided with a list of participating members of the network, at registration. Periodic updates of new members may be circulated from time to time.

In accordance with the disclosed embodiment, the control computer T16 simply actuates the auto dialer T14 to establish telephonic communication with buyers after which the audio response unit T18 notifies the buyer. Alternatives involve the utilization of facsimile or the like capability or various forms of electronic mail may be incorporated for utilization. In any event, the select group of buyers is notified that the presentation on a hair shampoo packaged for women is accessible by interfacing through the telephone structure T12. Responding buyers (call type "B") are qualified as described above, then coupled to the video file server T34 to receive the video presentation. Thereafter, interested buyers may directly contact the vendor, typically for further video communication. Thus, the foundation for a transaction is completed rapidly and effectively with substantial communication of the goods involved and related considerations.

Another possibility involves type "C" calls, whereby a buyer distributes a request for proposal, e.g. seeks data relating to merchandise and an invitation to purchase. Again, various communications may be provided to a single select group or sub-group of vendors based on buyer data, e.g. merchandise codes. For example, to consider another specific form of communication in accordance herewith, after qualification, a buyer might use video communication to notify vendors with a graphic such as one illustrated in FIG. 8 showing an exemplary buyer request form providing specific information of the merchandise. Blank forms may be stored in a forms directory (e.g. menu-driven) or the like on each buyer's terminal. Thus, when making a request for proposals, a buyer may simply access a blank form and enter the specific information. Essentially, a merchandise code number "472361" is supplied, indicating the specific product as also identified in the graphic. After the notice has been sent selectively to vendors, a message as represented in FIG. 9 may be transmitted to the buyer from the central traffic control system TIS. Note that a check digit may be supplied. Likewise, vendors may access blank forms, similar to the exemplary buyer request forms, to indicate special offerings.

Following receipt of a request for proposal, or invitation for offer, interested vendors may submit a video presentation as described above. Accordingly video presentations (video transcriptions) of vendor data are communicated and further communication may result in the consummation of a transaction as explained above.

Figure 10:
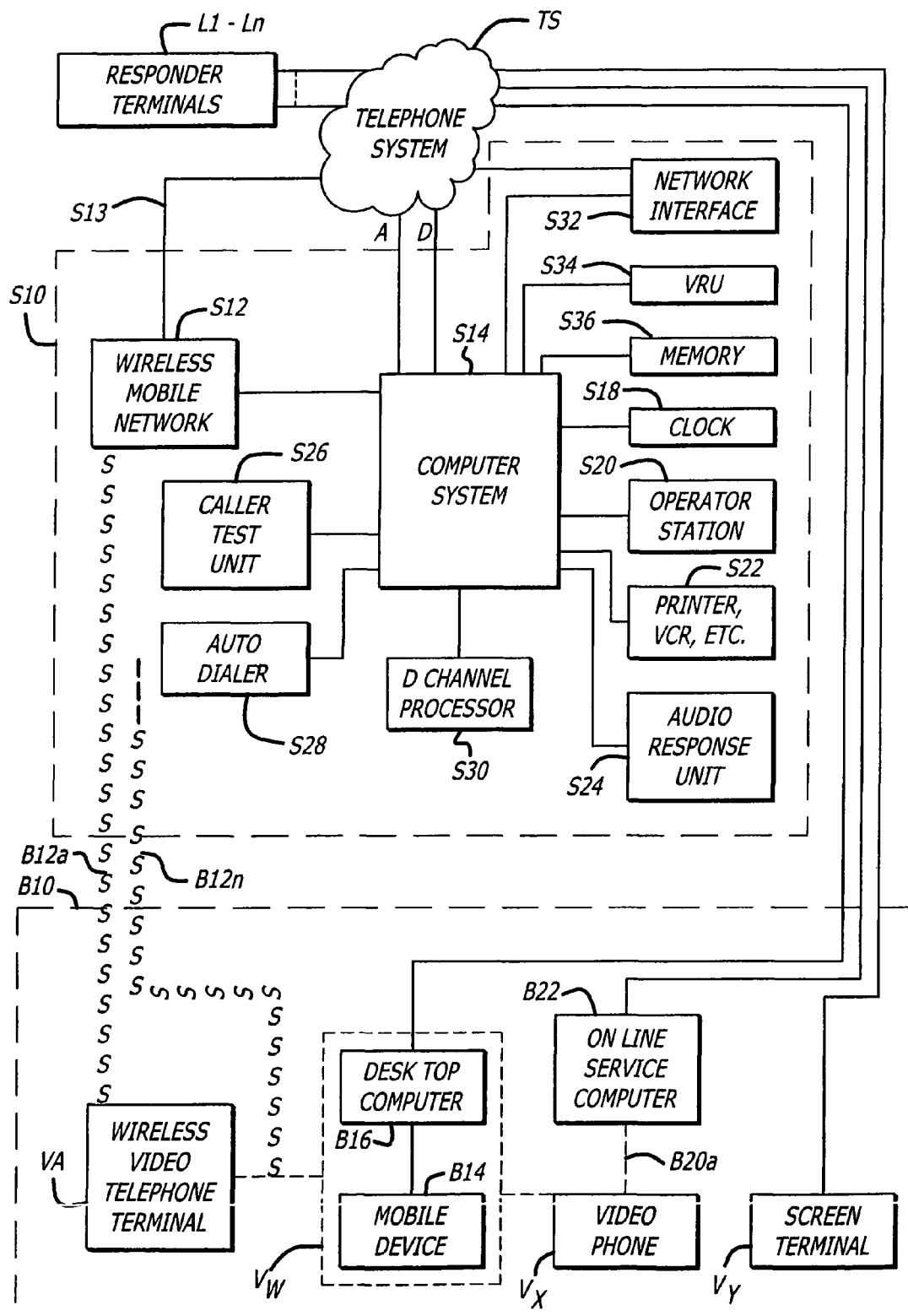
FIG. 10 is a block diagram of a system in accordance with another embodiment of the invention illustrating the communication system.

In view of the above descriptions and explanations, another disclosed embodiment is depicted in FIG. 10 and will now be considered. To some extent, components previously identified and described may bear similar reference identification; however, generally components of the traffic control system S10 (FIG. 10, dashed line block) and the inquiry systems or terminals B10 (bottom) are distinctly identified.

For purposes of explanation, an exemplary merchandising application again will be presented; however, again it is to be understood that the system may be employed in a multitude of applications. Essentially, such applications involve users at user terminals, (e.g. buyers) and responding sites (e.g. vendors) with video data being supplied to user terminals, for example, to result in a transaction.

Although the responder location sites or terminals L1-Ln (FIG. 10, top) as previously described are collectively represented, it is to be understood that such sites may well incorporate various disclosed aspects of the inquiry terminals. However, as explained above, the responder location terminals L1-Ln store video presentation data and are individually coupled to a dial-up public telephone system TS which is in turn coupled to the traffic control system S10 through analog and digital channels A and D, as explained above. The dial-up public telephone system TS also is variously connected to inquiry terminals B10 as described below in substantial detail. Accordingly, the system of FIG. 10 affords a capability of serving an inquiring user, e.g. at a buyer terminal, and a responder site, e.g. a vendor terminal, as described in detail above.

The inquiry terminals B10 (FIG. 10, bottom) are illustrated in a variety of forms for communication accommodated by the public telephone system TS and the traffic control system S10. Note that each of the exemplary terminal configurations may be present in varying numbers as indicated by the interconnecting horizontal dashed lines. Also note that both mobile wireless and direct terminals are accommodated. However, in accordance herewith, and as described in detail above, ultimate communications (direct or indirect) of the inquiry terminals B10 typically involve communications with individual of the responder or vendor terminals L1-Ln.

A first exemplary form of inquiry terminal is represented by the terminal Va (FIG. 10, bottom left). A wireless coupling (dashed line B12a) is indicated between the terminal Va and the traffic control system S10, specifically to a wireless mobile network S12. For example, a European Patent Application EPO 782 364 A2 filed Dec. 23, 1996 and published Jul. 2, 1997 discloses wireless video telephone terminals with a central control station interfacing a telephone network. The application is incorporated by reference herein.

In FIG. 10, the terminal Va, a form of mobile wireless video phone, communicates with the wireless mobile network S12 (dashed line B12a) which network for example incorporates central equipment as a base station, and which operates with other components to enable wireless mobile telephone terminals to roam through different areas or cells. Note that the wireless mobile network S12 may be remote and distinct from the traffic control S10. In such a case, communication may be with the system S10 through the public telephone system TS. Thus, from various locations, mobile instruments as the terminal Va, can communicate through the mobile network S12 (or an alternate) and the dial-up public telephone system TS (line S13) in order to communicate with other telephone terminals including the terminals L1-Ln.

The wireless mobile network S12 may incorporate a form of switching system sometimes termed a "mobile switching center" for communication with the public telephone system TS or directly with a computer system S14. Basic aspects of structures for the wireless mobile platform S12 are well known; and in that regard, such mobile communications are treated in detail in a book entitled Mobile_Telecommunications Network, by Michael D. Gallagher and Randal A. Snyder, McGraw-Hill, 1997, ISBN 0-07-063314-2, incorporated by reference herein.

Again, note that while in FIG. 10, the wireless mobile network S12 is shown in the traffic control system S10 it is to be understood that the network S12 may be operated separately from the system S10. As indicated in the above-cited book, the wireless mobile network S12 can be configured in accordance with a wide variety of possibilities and also may constitute a number of interrelated structures distributed over a large area.

While only a single inquiry terminal Va is shown in FIG. 10, it is to be understood that the wireless mobile network S12 is configured to accommodate a multitude of such wireless terminals, through wireless couplings B12a, through B12n. Specifically, through the wireless coupling B12a, communication is provided from mobile wireless terminal Va to the wireless mobile network S12, and then to the computer system S14. As indicated above, the network S12 and the computer S14 function as a wireless platform and communicate with the public telephone system TS, for example to communicate with the responder locations L1-Ln.

Next, consider the representative terminal Vw, with a connection B18a which is somewhat similar to that of the terminals V1-Vn of FIG. 2. However, the telephone terminal Vw takes the form of a mobile device B14 operative with a desktop computer B16 functioning through the telephonic connection B18 to the telephone system TS. Thus, the terminal Vw may communicate through the public telephone system TS with the computer system S14 using the paths A and D as explained above. Furthermore, communication may be established from the terminal Vw, to communicate with responders, e.g. vendors represented at the terminals L1-Ln. A form of system for interconnection between a desktop computer B16 and a mobile device B14 is disclosed in U.S. Pat. No. 6,272,545, Flanagin et al., entitled "System and Method for Interaction Between One or More Desktop Computers and One or More Mobile Devices," issued Aug. 7, 2001 and incorporated by reference herein.

The exemplary inquiry terminal Vx also is a wireless structure, however, functioning through a wireless link indicated by a dashed line B20a for communication with an on-line computer service B22. Accordingly, the terminal Vx communicates through the service B22 and the public telephone system TS with the computer system S14. In that regard, an Internet protocol video phone adapter is disclosed in U.S. Pat. No. 6,201,562, Lor, entitled "Internet Protocol Video Phone Adapter for High Bandwidth Data Access," issued Mar. 13, 2001 and incorporated by reference herein.

The exemplary terminal Vy may take a form similar to the terminals described with respect to FIG. 2 and is connected to the dial-up public telephone system TS in a similar manner. Thus, the system of FIG. 10 incorporates the traffic control system S110, capable of serving various forms of buyer terminals, as exemplified, in varying numbers.

Turning now to the traffic control system S10, generally, communication is afforded from the terminals B10 and the responder sites or terminals L1-Ln through the mobile network S12 and/or the telephone system TS. In that regard, the wireless mobile network platform S12, along with the computer system S14, interface the wireless buyer terminals to impose control and accomplish communication. Other terminals communicate with the computer system S14 through the telephone system TS.

The detailed operation of the computer system S14 is treated below; however, preliminarily consider other component elements of the traffic control system S10. Several components of the traffic control system S10 may take a form similar to elements in the traffic control system TIS of FIG. 2. However, in that regard, different identification symbols are employed. The traffic control system S10 includes a clock S18, (left central) an operator station S20, a printer, VCR, etc. S22, an audio response unit S24, a caller test unit S26, (left) an auto dialer S28 and a D-channel signal processor S30, all of which may take a form similar to such elements of the same name appearing in FIG. 2.

Additionally, the traffic control system S10 separately illustrates a network interface S32, (upper right) a voice recognition unit S34 and a memory S36. The network interface unit S32 functions in cooperation with the public telephone system TS and may incorporate various well-known structures as a telephonic format switch. The voice recognition unit S34 functions in cooperation with the computer system S14 to accommodate voice-recognition operation at the terminals B10. The memory S36 provides control and programming data for the system S14 and additionally stores significant data as in assigned cells relating to individual buyer and vendor terminals, somewhat as treated above.

Extensive responder data is stored, either at the responder location terminals L1-Ln, at the traffic control system S10, or at both (see FIG. 6). For example, pursuing the merchandising example, for a respondent who is a vendor, the vendor data would include data relating to merchandise as for example: video transcriptions for display of merchandise, or services, designations (as codes), price schedules, and group classifications, etc. Vendor data also may include identification data, as for example: PIN data, telephone number data, name data, personal data and so on. Additional stored vendor data may include format data, buyer data and transaction data as mentioned above.

Figure 11:
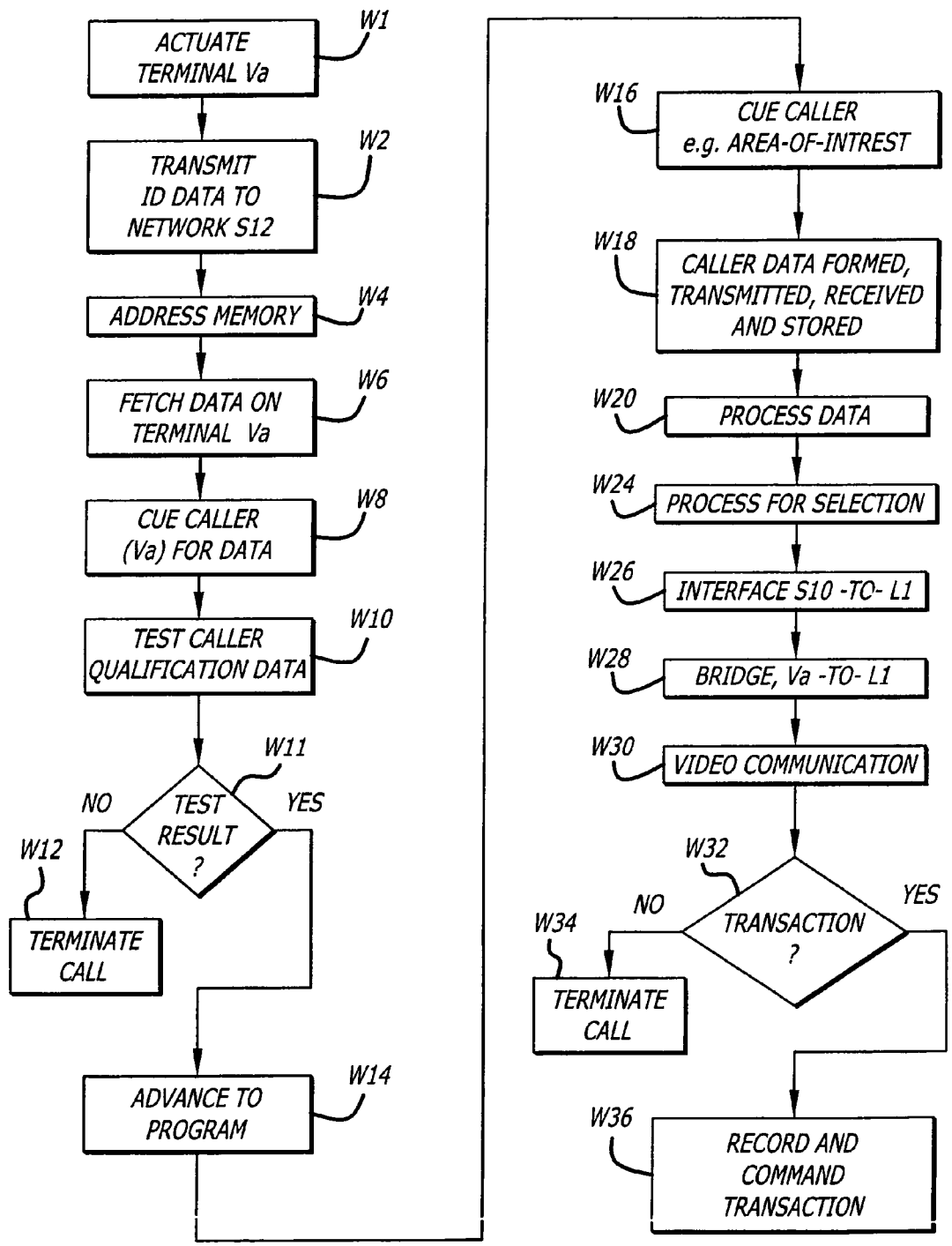
FIG. 11 is a logic flow diagram illustrating certain exemplary operations of the system of FIG. 11.

To complete a comprehensive understanding of the system as depicted in FIG. 10, reference also will now be made to the flow diagram of FIG. 11 with respect to various operations definitive of the central computer system S114 and the cooperating elements of the control system S10.

Initially, assume the presence of an inquiring user, e.g. a buyer (person) at the terminal Va, with a desire to pursue a possible communication with an unknown vendor accessible through one of the sites or locations L1-Ln. To initiate the process, the terminal Va is actuated as indicated by a block W1 (FIG. 11—upper left). Upon activation, the terminal Va (FIG. 10) establishes communication with the wireless mobile network S12 through the radio channel represented by the dashed line B12a. As part of the communication, the terminal Va transmits certain initial inquiry data to the wireless mobile network S12, specifically, identification data is transmitted, e.g. the identifying MIN number that characteristically is used in wireless communication. The operation is represented in FIG. 11 by the block W2.

Upon receiving the identification information for the terminal Va, the wireless mobile network S12 addresses a memory, e.g. the memory S36 through the computer system S14 to obtain reference data on the terminal Va. These operational steps are represented in FIG. 11 by the blocks W4 and W6.

The central computer system S14 may store or address the memory S36 regarding the terminal Va in relation to a wide variety of stored data. For example, the basic data stored for buyers (see FIG. 7) may include the following:

(1) additional identification, e.g. name, electronic address, group, merchandise data, identification data, and so on.
(2) anti-fraud information
(3) qualification criteria
(4) specific limitations and/or enablements
(5) individuals persons ID, e.g. name, credit data, etc.
(6) addresses
(7) buyer related merchandise data, etc.

With various basic data available, the caller at the terminal Va may be cued for qualification data as indicated by the block W8. For example, the caller may be cued for further inquiry data, for example, a personal identification number (PIN) or for speech (as for a voice print) or for codes or various other anti-fraud or identification confirmation criteria.

Receiving the cue, the caller actuates the terminal Va, as by keypad entries to provide response data. The wireless network S12 supplies the data which is processed by the computer system S14 with the test unit S26 to accomplish a test as represented by a block W10 in FIG. 11. As suggested above, if implemented, the tests may take a multitude of forms regarding the buyer qualification and/or the qualification of the calling terminal. The test results are illustrated by the query block W11. If the test results are negative ("NO") the call is terminated as indicated by the block W12. Conversely, a positive result ("YES") advances the process to the next stage of operation, recognizing that the call is accepted.

If the illustrative call from the terminal Va is approved or accepted without qualification, the computer system S14 sets up the appropriate communication formats to proceed based on stored data or circumstances. For example, if the caller (active user) is communicating by speech, the voice recognition unit S34 (FIG. 10) is actuated. Also, depending on the video format indicated by the basic data, the system performs the requisite format switch operations. These steps are illustrated by the block W14. Thus, compatible communication, for an active user including video, may proceed.

With communication established, the ARU S24 (FIG. 11) is actuated to prompt the user at terminal Va through the network S12 to provide direction. Recognizing the multitude of possible applications for systems in accordance herewith, the direction, or area of interest data, for an inquiry may vary to a considerable extent. For example, such subject matter data for a merchandising application involving goods or services, may specify a type of merchandise or an area of interest for goods or services. In a dating service or employment agency application, the direction or routing data for an inquiry may take the form of personal characteristics, and so on. In any event, the step is illustrated in FIG. 11 by the block W16 and in that regard, as an example, types of merchandise may be specified as explained above.

So prompted, the user normally enters the subject matter data (selection data) which is received and stored as indicated by the block W18. Thus, representative routing data is available to the computer system S14. The inquiry selection data, stored in the memory S36, is processed with reference vendor data as preliminarily indicated by the block W20.

If an online communication between an inquiry terminal (Va-Vy) and a respondent terminal (L1-Ln) is to be established, the central computer system S14 may further refine the stored data as indicated by the processing of a block W24. In accordance with a controlling algorithm, the data may be variously processed to locate one or more responder sites, e.g. vendor sites or a sequence of sites. The step is illustrated in FIG. 11 by a block W24.

To consider the processing of the received inquiry data (subject matter data) in greater detail, the course of action, may, for example, be to select a responder site, e.g. responder terminal L1 for an active inquiring user. As indicated, the type of subject matter data provided by an inquiring user is processed to select one or more responder sites. The subject matter data is part of the inquiry data received and specifies the area of interest or type of communication that is sought with a respondent site. Essentially, as illustrated by the block 24 (FIG. 11) the computer system S14 (FIG. 10) processes the inquiry subject matter data in relation to stored reference respondent data to select a respondent site or terminal. Generally, the selection is based on types of subject matter, expressed for example as an area of interest. As explained above, in a merchandising application a buyer user might specify "skin cream cleansing" as the area of interest or type of subject matter data for communication. The central computer system 14 would then process such inquiry data with stored respondent data to select at least one respondent site, e.g. vendor site L1. Of course, any of a variety of coincidence or comparison algorithms might be employed to make the selection as indicated by the block W24 (FIG. 11). With the vendor site L1 selected for example, the inquiring caller or user terminal, for example terminal Va, is placed in communication with the vendor terminal L1. Specifically, with the responder terminal selected, the computer system S14 actuates the auto dialer S28 to provide dial-up signals through the network interface S32 to accomplish a connection through the public telephone system TS, ultimately with the select vendor terminal L1. The operational step is illustrated in FIG. 11 by a block W26.

With the connection established, the active buyer terminal Va is bridged through the traffic control system S10 and the dial-up public telephone system TS to the select vendor terminal L1 as illustrated by the block W28. Thereafter, video communication exchanges may occur as represented by the block W30 which may or may not result in the consummation of a transaction. Accordingly, the query block W32 represents the possibilities. If no transaction is consummated, the process is terminated as indicated by a block W34. Alternatively, if a transaction is consummated it is recorded and commanded as indicated by the block W36.

As indicated above and as illustrated in FIG. 10, the inquiry terminals B10 also may include terminals as exemplified by an inquiry terminal Vw comprising a mobile device B14 and a desktop computer B16. The mobile device B14 essentially controls the desktop computer B16 to function through a line B18 and the telephone system TS to interface the central computer system S14. Note that the mobile device B14 may be operated somewhat as explained above with respect to the operation of the wireless terminal Va.

An exemplary terminal Vx also is wireless and communicates directly with an on-line service B22 in accordance herewith. Note that the buyer terminal Vx may take a video form of a handheld unit utilizing the principles of mobile wireless communication to accomplish the requisite communication with the on-line computer service V22. Accordingly, acting through the "Internet", the system attains the process steps to potentially accomplish a transaction as described above. In that regard, as indicated, the steps may be few or involve considerable detail; however, the steps could include:
 (1) receiving and obtaining identification data from an inquiry terminal
 (2) utilizing identification data, fetching basic data for a terminal
 (3) qualifying a communication as with respect to an inquiry terminal or with regard to anti-fraud
 (4) setting communication formats as with respect to video and DTMF versus voice
 (5) obtaining routing or selection data
 (6) processing selection data, as in combination with reference data to select a respondent.
 (7) coupling an inquiry terminal to a respondent terminal for video communication.

The inquiry terminal Vy also may take a form as illustrated with respect to FIG. 2. Thus, it may be seen that in the composite system of FIG. 11, various different types of terminals are represented and may be employed in varying numbers. As suggested, hybrids and deviations of such terminals are contemplated.

In view of the above description, it will be apparent that numerous operating formats, programs and layouts may be accomplished using a wide variety of videophone equipment in cooperation with computing and telephone apparatus. As indicated above, the disclosed embodiments afford some exemplary arrangements; however, the scope hereof should not be so confined, rather the scope hereof should be in accordance with the claims as set forth below.

What is claimed is:

1. A process for directing and exchanging data communications in real-time under control of one or more multiple coordinated central control units to accomplish transactions relating to merchandise or services available for purchase, the process involving interfacing under control of the one or more multiple coordinated central control units, one or more buyers at a plurality of remote locations using remote video terminals including personal computers with video capability, the one or more multiple coordinated central control units in communication with one or more vendors and having a capability to electronically communicate through a public communication system, the process comprising the steps of:
 interfacing one or more buyers with the one or more multiple coordinated central control units for electronic communication;
 receiving identification data from at least one buyer, the identification data qualifying the at least one buyer for select communications with the one or more multiple coordinated central control units;
 interfacing one or more buyers with one or more live operator stations under control of the one or more multiple coordinated central control units, wherein at least one of the one or more live operator stations has graphics display capabilities and has access to at least certain data associated with the one or more multiple coordinated central control units;
 receiving request data from one or more buyers, the request data indicating an area of interest relating to merchandise or services available for purchase;
 storing at least part of the request data;
 interfacing one or more buyers to a video memory under control of the one or more multiple coordinated central control units, the video memory storing one or more high resolution video images and text data relating to merchandise or services available for purchase from the one or more vendors;
 facilitating access to proposed data from the video memory, the proposed data including video images and text data responsive to the request data for viewing by a buyer;
 storing data relating to one or more transactions initiated by one or more buyers; and
 transmitting to at least one buyer a message including data relating to a transaction initiated by the at least one buyer after an interface between the at least one buyer and the one or more multiple coordinated central control units is terminated, the data including a number identifying the transaction.

2. A process according to claim 1 wherein the subject matter for communication involves items relating to a dating service.

3. A process according to claim 2 wherein the request data includes an indication of the amount that a buyer is willing to pay for the dating service.

4. A process according to claim 3 wherein the amount that a buyer is willing to pay for the dating service is expressed as a maximum amount.

5. A process according to claim 1 wherein a buyer terminal is further connected to receive video data from another video memory site.

6. A process according to claim 1 wherein at least part of the request data is communicated by electronic mail.

7. A process according to claim 1 wherein the proposed data includes dynamic video images.

8. A process according to claim 1 wherein the proposed data includes high resolution still image video.

9. A process according to claim 1 wherein the request data includes a check digit.

10. A process according to claim 1 wherein the request data includes billing data for a buyer.

11. A process according to claim 1 wherein interfacing one or more buyers with the one or more multiple coordinated central control units includes interfacing a personal computer as a remote video terminal.

12. A process according to claim 1 wherein interfacing one or more buyers with the one or more multiple coordinated central control units includes voice recognition operations for the one or more buyers.

13. A process according to claim 1 wherein said step of receiving request data includes communication through an on-line computer service.

14. A process according to claim 1 wherein the step of interfacing one or more buyers with one or more live operator stations facilitates electronic communications between at least one buyer and at least one live operator station.

15. A process according to claim 14 wherein the at least one buyer's electronic communications with the live operator station include real-time voice communication.

16. A process according to claim 14 wherein the at least one buyer's electronic communications with the live operator station include real-time video communication.

17. A process according to claim 14 wherein the at least one buyer's electronic communications with the live operator station include live person-to-person video communication.

18. A process according to claim 1 wherein the step of interfacing one or more buyers with one or more live operator stations facilitates real-time voice communications between at least one buyer and at least one live operator terminal.

19. A process according to claim 18 wherein an auto dialer associated with the one or more multiple coordinated central control units facilitates the step of interfacing one or more buyers with one or more live operator stations for real-time voice communications.

20. A process according to claim 1 further comprising the step of monitoring time limitations relating to a purchase of merchandise or services.

21. A process according to claim 1 wherein the proposed data includes a vendor merchandise or service offering.

22. A process according to claim 21 further comprising the step of obtaining buyer reaction data relating to the vendor merchandise or service offering.

23. A process according to claim 1 wherein at least one remote video terminal is located in a buyer's home.

24. A process according to claim 1 further comprising the step of facilitating access by one or more buyers to one or more vendors under control of the one or more multiple coordinated central control units.

25. A process according to claim 1 further comprising the step of interfacing one or more buyers with one or more audio response units under control of the one or more multiple coordinated central control units.

26. A process according to claim 1, further comprising the step of:
   notifying one or more buyers regarding a new merchandise or service offering from a vendor.

27. A process according to claim 26, wherein the new merchandise or service offering is available for a limited period of time.

28. A process according to claim 26, wherein the one or more buyers subsequently communicate via the one or more multiple coordinated central control units regarding the new merchandise or service offering.

29. A process according to claim 28, further comprising the step of:
   storing, via the one or more multiple coordinated central control units, data relating to the one or more buyers' subsequent communications regarding the new merchandise or service offering.

30. A process according to claim 26, further comprising obtaining buyer reaction data regarding the new merchandise or service offering.

31. A process according to claim 1 wherein certain of the one or more vendors are accorded a priority status under control of the one or more multiple coordinated central control units.

32. A process according to claim 1 wherein the message is transmitted via electronic mail.

33. A process for directing and exchanging data communications in real-time under control of one or more multiple coordinated central control units to accomplish transactions relating to merchandise or services available for purchase, the process involving interfacing under control of the one or more multiple coordinated central control units, one or more buyers at a plurality of remote locations using remote video terminals including personal computers with video capability, the one or more multiple coordinated central control units in communication with one or more vendors and having a capability to electronically communicate through a public communication system, the process comprising the steps of:
   interfacing one or more buyers with the one or more multiple coordinated central control units for electronic communication;
   receiving identification data from at least one buyer, the identification data qualifying the at least one buyer for select communications with the one or more multiple coordinated central control units;
   receiving request data from at least one buyer, the request data including one or more merchandise or service categories and subcategories and an indication of a price the at least one buyer is willing to pay for merchandise or services relating to the one or more merchandise or service categories and subcategories;
   storing at least part of the request data;
   interfacing one or more buyers to a video memory under control of the one or more multiple coordinated central control units, the video memory storing one or more high resolution video images and text data relating to merchandise or services available for purchase from the one or more vendors;
   facilitating access to proposed data from the video memory, the proposed data including video images and text data responsive to the request data for viewing by a buyer;
   storing data relating to one or more transactions initiated by one or more buyers;
   maintaining in a memory associated with the one or more multiple coordinated central control units data indicating a rating or a priority designation, or both, for at least one of the one or more vendors; and
   transmitting to at least one buyer a message including data relating to a transaction initiated by the at least one buyer after an interface between the at least one buyer and the one or more multiple coordinated central control units is terminated, the data including a number identifying the transaction.

34. A process according to claim 33 wherein the indication of the price is a maximum amount that the at least one buyer is willing to pay for the merchandise or services.

35. A process according to claim 33 wherein the one or more merchandise or service categories and subcategories are represented by codes.

36. A process according to claim 35 wherein the codes are represented by numerical representations.

37. A process according to claim 33, further comprising the step of:
   notifying one or more buyers regarding a new merchandise or service offering from a vendor.

38. A process according to claim 37, wherein the new merchandise or service offering is available for a limited period of time.

39. A process according to claim 37, wherein the one or more buyers subsequently communicate via the one or more multiple coordinated central control units regarding the new merchandise or service offering.

40. A process according to claim 39, further comprising the step of:

storing, via the one or more multiple coordinated central control units, data relating to the one or more buyers' subsequent communications regarding the new merchandise or service offering.

41. A process according to claim 37, further comprising obtaining buyer reaction data regarding the new merchandise or service offering.

42. A process according to claim 33 wherein at least one remote video terminal is located in a buyer's home.

43. A process according to claim 33 further comprising the step of facilitating access by one or more buyers to one or more vendors under control of the one or more multiple coordinated central control units.

44. A process according to claim 33 further comprising the step of monitoring time limitations relating to a purchase of merchandise or services.

45. A process according to claim 33 wherein at least certain of the proposed data reflects, at least in part, the rating or the priority designation, or both, maintained for the at least one of the one or more vendors.

46. A process according to claim 33 wherein the message is transmitted via electronic mail.

47. A process for directing and exchanging data communications in real-time under control of one or more multiple coordinated central control units to accomplish transactions relating to merchandise or services available for purchase, the process involving interfacing under control of the one or more multiple coordinated central control units, one or more buyers at a plurality of remote locations using remote video terminals including personal computers with video capability, the one or more multiple coordinated central control units in communication with one or more vendors and having a capability to electronically communicate through a public communication system, the process comprising the steps of:

interfacing one or more buyers with the one or more multiple coordinated central control units for electronic communication;

receiving identification data from at least one buyer, the identification data qualifying the at least one buyer for select communications with the one or more multiple coordinated central control units;

receiving request data from one or more buyers, the request data indicating an area of interest relating to merchandise or services available for purchase;

storing at least part of the request data;

interfacing one or more buyers to a video memory under control of the one or more multiple coordinated central control units, the video memory storing one or more high resolution video images and text data relating to merchandise or services available for purchase from the one or more vendors;

facilitating access to proposed data from the video memory, the proposed data including video images and text data responsive to the request data for viewing by a buyer;

storing ratings data relating to the one or more vendors;

storing data relating to one or more transactions initiated by one or more buyers; and transmitting to at least one buyer a message including data relating to a transaction initiated by the at least one buyer after an interface between the at least one buyer and the one or more multiple coordinated central control units is terminated, the data including a number identifying the transaction.

48. A process according to claim 47 further comprising the step of monitoring time limitations relating to a purchase of merchandise or services.

49. A process according to claim 47 wherein the proposed data includes a vendor merchandise or service offering.

50. A process according to claim 49 further comprising the step of obtaining buyer reaction data relating to the vendor merchandise or service offering.

51. A process according to claim 47, further comprising the step of:

notifying one or more buyers regarding a new merchandise or service offering from a vendor.

52. A process according to claim 51, wherein the new merchandise or service offering is available for a limited period of time.

53. A process according to claim 51, wherein the one or more buyers subsequently communicate via the one or more multiple coordinated central control units regarding the new merchandise or service offering.

54. A process according to claim 53, further comprising the step of:

storing, via the one or more multiple coordinated central control units, data relating to the one or more buyers' subsequent communications regarding the new merchandise or service offering.

55. A process according to claim 51, further comprising obtaining buyer reaction data regarding the new merchandise or service offering.

56. A process according to claim 47 wherein at least one remote video terminal is located in a buyer's home.

57. A process according to claim 47 further comprising the step of facilitating access by one or more buyers to one or more vendors under control of the one or more multiple coordinated central control units.

58. A process according to claim 47 wherein certain of the one or more vendors are accorded a priority status under control of the one or more multiple coordinated central control units.

59. A process according to claim 47 wherein the message is transmitted via electronic mail.

60. A process for directing and exchanging data communications in real-time under control of one or more multiple coordinated central control units to accomplish transactions relating to merchandise or services available for purchase, the process involving interfacing under control of the one or more multiple coordinated central control units, one or more buyers at a plurality of remote locations using remote video terminals including personal computers with video capability, the one or more multiple coordinated central control units in communication with one or more vendors and having a capability to electronically communicate through a public communication system, the process comprising the steps of:

interfacing one or more buyers with the one or more multiple coordinated central control units for electronic communication;

receiving identification data from at least one buyer, the identification data qualifying the at least one buyer for select communications with the one or more multiple coordinated central control units;

receiving request data from one or more buyers, the request data including one or more merchandise or service categories and subcategories;

storing at least part of the request data;

interfacing one or more buyers to a video memory under control of the one or more multiple coordinated central control units, the video memory storing one or more high resolution video images and text data relating to merchandise or services available for purchase from the one or more vendors;

facilitating access to proposed data from the video memory, the proposed data including video images and text data responsive to the request data for viewing by a buyer;

receiving an indication of a price at least one buyer is willing to pay for merchandise or services relating to the one or more merchandise or service categories and subcategories, wherein the proposed data is selected based, at least in part, on the price;

storing data relating to one or more transactions initiated by one or more buyers;

maintaining in a memory associated with the one or more multiple coordinated central control units data indicating a rating or a priority designation, or both, for at least one of the one or more vendors; and transmitting to at least one buyer a message including data relating to a transaction initiated by the at least one buyer after an interface between the at least one buyer and the one or more multiple coordinated central control units is terminated, the data including a number identifying the transaction.

61. A process according to claim 60 wherein the indication of the price is a maximum amount that the at least one buyer is willing to pay for the merchandise or services.

62. A process according to claim 60 wherein the one or more merchandise or service categories and subcategories are represented by codes.

63. A process according to claim 62 wherein the codes are represented by numerical representations.

64. A process according to claim 60, further comprising the step of:

notifying one or more buyers regarding a new merchandise or service offering from a vendor.

65. A process according to claim 64, wherein the new merchandise or service offering is available for a limited period of time.

66. A process according to claim 64, wherein the one or more buyers subsequently communicate via the one or more multiple coordinated central control units regarding the new merchandise or service offering.

67. A process according to claim 66, further comprising the step of:

storing, via the one or more multiple coordinated central control units, data relating to the one or more buyers' subsequent communications regarding the new merchandise or service offering.

68. A process according to claim 64, further comprising obtaining buyer reaction data regarding the new merchandise or service offering.

69. A process according to claim 60 further comprising the step of monitoring time limitations relating to a purchase of merchandise or services.

70. A process according to claim 60 wherein the proposed data includes a vendor merchandise or service offering.

71. A process according to claim 70 further comprising the step of obtaining buyer reaction data relating to the vendor merchandise or service offering.

72. A process according to claim 60 wherein at least one remote video terminal is located in a buyer's home.

73. A process according to claim 60 further comprising the step of facilitating access by one or more buyers to one or more vendors under control of the one or more multiple coordinated central control units.

74. A process according to claim 60 wherein at least certain of the proposed data reflects, at least in part, the rating or the priority designation, or both, maintained for the at least one of the one or more vendors.

75. A process according to claim 60 wherein the message is transmitted via electronic mail.

76. A process for directing and exchanging data communications in real-time under control of one or more multiple coordinated central control units to accomplish transactions relating to merchandise or services available for purchase, the process involving interfacing under control of the one or more multiple coordinated central control units, one or more buyers at a plurality of remote locations using remote video terminals including personal computers with video capability, the one or more multiple coordinated central control units in communication with one or more vendors and having a capability to electronically communicate through a public communication system, the process comprising the steps of:

transmitting to one or more buyers a first message including data relating to merchandise or service offerings of one or more vendors;

interfacing the one or more buyers with the one or more multiple coordinated central control units for electronic communication;

interfacing one or more other buyers with the one or more multiple coordinated central control units for electronic communication;

receiving identification data from at least one buyer, the identification data qualifying the at least one buyer for select communications with the one or more multiple coordinated central control units;

interfacing one or more buyers with one or more live operator stations under control of the one or more multiple coordinated central control units, wherein at least one of the one or more live operator stations has graphics display capabilities and has access to at least certain data associated with the one or more multiple coordinated central control units;

receiving request data from one or more buyers, the request data including one or more merchandise or service categories and subcategories;

storing at least part of the request data;

interfacing one or more buyers to a video memory under control of the one or more multiple coordinated central control units, the video memory storing one or more high resolution video images and text data relating to merchandise or services available for purchase from the one or more vendors;

facilitating access to proposed data from the video memory, the proposed data including video images and text data responsive to the request data for viewing by a buyer;

storing data relating to one or more transactions initiated by one or more buyers; and transmitting to at least one buyer a second message including data relating to a transaction initiated by the at least one buyer after an interface between the at least one buyer and the one or more multiple coordinated central control units is terminated, the data including a number identifying the transaction.

77. A process according to claim 76 wherein the step of interfacing one or more buyers with one or more live operator stations facilitates electronic communications between at least one buyer and at least one live operator station.

78. A process according to claim 77 wherein the at least one buyer's electronic communications with the live operator station include real-time voice communication.

79. A process according to claim 77 wherein the at least one buyer's electronic communications with the live operator station include real-time video communication.

80. A process according to claim 77 wherein the at least one buyer's electronic communications with the live operator station include live person-to-person video communication.

81. A process according to claim 76 wherein the step of interfacing one or more buyers with one or more live operator stations facilitates real-time voice communications between at least one buyer and at least one live operator terminal.

82. A process according to claim 81 wherein an auto dialer associated with the one or more multiple coordinated central control units facilitates the step of interfacing one or more buyers with one or more live operator stations for real-time voice communications.

83. A process according to claim 76 further comprising the step of monitoring time limitations relating to a purchase of merchandise or services.

84. A process according to claim 76 wherein the proposed data includes a vendor merchandise or service offering.

85. A process according to claim 84 further comprising the step of obtaining buyer reaction data relating to the vendor merchandise or service offering.

86. A process according to claim 76 wherein at least one remote video terminal is located in a buyer's home.

87. A process according to claim 76 further comprising the step of facilitating access by one or more buyers to one or more vendors under control of the one or more multiple coordinated central control units.

88. A process according to claim 76 further comprising the step of interfacing one or more buyers with one or more audio response units under control of the one or more multiple coordinated central control units.

89. A process according to claim 76 wherein at least one of the one or more buyers to whom a first message is transmitted is selected for such transmittal based, at least in part, upon request data of the at least one buyer previously stored in a memory associated with the multiple coordinated central control units.

90. A process according to claim 76 wherein certain of the one or more vendors are accorded a priority status under control of the one or more multiple coordinated central control units.

91. A process according to claim 76 wherein the first and second messages are transmitted via electronic mail.

92. A process according to claim 33 wherein the rating indicates at least dependability or efficiency.

93. A process according to claim 45 wherein the rating indicates at least dependability or efficiency.

94. A process according to claim 47 wherein the ratings data indicates at least dependability or efficiency.

95. A process according to claim 60 wherein the rating indicates at least dependability or efficiency.

96. A process according to claim 74 wherein the rating indicates at least dependability or efficiency.

97. A process according to claim 33 wherein the priority designation reflects at least an established relationship.

98. A process according to claim 45 wherein the priority designation reflects at least an established relationship.

99. A process according to claim 60 wherein the priority designation reflects at least an established relationship.

100. A process according to claim 74 wherein the priority designation reflects at least an established relationship.

101. A process according to claim 66 wherein the rating is graphically displayed.

102. A process according to claim 45 wherein the rating is graphically displayed.

103. A process according to claim 47 wherein the rating is graphically displayed.

104. A process according to claim 60 wherein the rating is graphically displayed.

105. A process according to claim 74 wherein the rating is graphically displayed.

106. A process according to claim 31 wherein at least certain of the proposed data reflects, at least in part, the priority status accorded to at least one of the vendors.

107. A process according to claim 58 wherein at least certain of the proposed data reflects, at least in part, the priority status accorded to at least one of the vendors.

108. A process according to claim 90 wherein at least certain of the proposed data reflects, at least in part, the priority status accorded to at least one of the vendors.

* * * * *

UNITED STATES PATENT AND TRADEMARK OFFICE
CERTIFICATE OF CORRECTION

PATENT NO. : 8,315,364 B2
APPLICATION NO. : 10/686883
DATED : November 20, 2012
INVENTOR(S) : Ronald A. Katz Page 1 of 1

It is certified that error appears in the above-identified patent and that said Letters Patent is hereby corrected as shown below:

Column 30,
Line 66, claim 78, change "with the live operator" to --with the at least one live operator--.

Column 31,
Line 2, claim 79, change "with the live operator" to --with the at least one live operator--.
Line 5, claim 80, change "with the live operator" to --with the at least one live operator--.
Line 10, claim 81, change "terminal" to --station--.

Signed and Sealed this
Second Day of April, 2013

Teresa Stanek Rea
*Acting Director of the United States Patent and Trademark Office*